(12) United States Patent
Yamauchi et al.

(10) Patent No.: US 7,987,375 B2
(45) Date of Patent: Jul. 26, 2011

(54) COMMUNICATION APPARATUS, CONTROL METHOD THEREOF AND COMPUTER READABLE MEDIUM

(75) Inventors: Hisayuki Yamauchi, Kawasaki (JP);
Taku Ogasawara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 873 days.

(21) Appl. No.: 11/934,857

(22) Filed: Nov. 5, 2007

(65) Prior Publication Data

US 2008/0120506 A1 May 22, 2008

(30) Foreign Application Priority Data

Nov. 20, 2006 (JP) ................................. 2006-313597
May 31, 2007 (JP) ................................. 2007-146105

(51) Int. Cl.
*G06F 12/14* (2006.01)
*H04L 9/32* (2006.01)
(52) U.S. Cl. ....................................... 713/193; 713/176
(58) Field of Classification Search .................. 713/193, 713/176
See application file for complete search history.

(56) References Cited

U.S. PATENT DOCUMENTS

| 6,801,340 | B1 | 10/2004 | Endo |
| 7,051,204 | B2 | 5/2006 | Pitsos |
| 7,239,434 | B2 | 7/2007 | Endo |
| 2005/0228986 | A1 | 10/2005 | Fukasawa et al. |
| 2006/0179299 | A1* | 8/2006 | Tanimoto et al. ............. 713/158 |
| 2006/0242413 | A1* | 10/2006 | Fujishiro et al. ............. 713/171 |
| 2007/0223054 | A1 | 9/2007 | Endo |

FOREIGN PATENT DOCUMENTS

| CN | 1695343 | 11/2005 |
| CN | 1801029 | 7/2006 |
| CN | 1819511 | 8/2006 |
| JP | 11-134263 | 5/1999 |
| JP | 2006-262408 | 9/2006 |

* cited by examiner

*Primary Examiner* — Kambiz Zand
*Assistant Examiner* — Aubrey H Wyszynski
(74) *Attorney, Agent, or Firm* — Fitzpatrick, Cella, Harper & Scinto

(57) ABSTRACT

If electronic certificate data containing a private key and public key to be used to add an electronic signature to data with timer transmission setting is deleted, no electronic signature can be added at the set timer transmission time. To accomplish this, when timer transmission and electronic signature addition using stored key information and electronic certificate are set for transmission target data (YES in S38), deletion of the stored key information and electronic certificate to be used for generating an electronic signature is restricted (S40).

8 Claims, 22 Drawing Sheets

COMMUNICATION APPARATUS, CONTROL METHOD THEREOF AND COMPUTER READABLE MEDIUM

BACKGROUND OF THE INVENTION

1. Field of the Invention

The present invention relates to a communication apparatus, a control method thereof and a computer readable medium, and more particularly, to a technique of transmitting transmission target data having an electronic signature.

2. Description of the Related Art

To protect the security of information in data communication, communication data is encrypted. Particularly, an encryption technique called PKI (Public Key Infrastructure) is widely used in recent years. The PKI is based on public key cryptography such as RSA encryption or digital signature and an authentication technology using an electronic certificate issued by an authentication organization called a certificate authority (CA). Server and client authentication through a network and data encryption key exchange are done by using the electronic certificate. In addition, data encryption communication using the exchanged key is executed, thereby ensuring safe network communication.

In SSL (Secure Socket Layer)/TLS (Transport Layer Security), which is an encryption communication protocol generally used in the WWW, server and client authentication using a digital signature is performed before the start of encryption communication.

Not only a communication apparatus such as a PC that executes the above-described communication but also an MFP (Multi-Function Peripheral) recently used in an office has a function of transmitting the electronic data of a document read by a scanner by e-mail (Japanese Patent Laid-Open No. 11-134263). In such an MFP, to ensure highly secure transmission, document data read by a scanner is converted into a data format such as PDF®. The MFP also has a function (to be referred to as an electronic-signature-attached electric document transmission function hereinafter) of adding an electronic signature based on the PKI to the converted data and transmitting the data. With this function, the MFP holds an MFP's or user's private key and an electronic certificate containing a public key for electronic signature creation in advance and adds an electronic signature to electronic data by using the private key and electronic certificate. This clarifies which user has created the electronic data by using which device (MFP). This allows a guarantee of the authenticity of the device and user and detection of alteration of electronic data. Hence, the security of electronic data can be maintained.

FIG. 19 is a view for simply explaining the mechanism of a conventional digital signature.

A transmitting-side MFP 1901 converts document data 1902 into PDF data 1903. A digest 1904 is calculated using a hash function based on the PDF data 1903. The digest 1904 is encrypted by using a transmitting-side private key 1905, thereby creating a digital signature 1906. Transmission data 1907 is generated by combining the generated PDF data 1903 with the digital signature 1906 and then it is transmitted to a receiving-side MFP 1911. The receiving-side MFP 1911 calculates a digest 1913 from the PDF data portion of reception data 1912 by using the same hash function as on the transmitting side. The digital signature of the reception data 1912 is decrypted to a digest 1915 by using a sender's public key 1914 which is acquired in advance. The receiving-side MFP compares the digest 1913 with the digest 1915, thereby detecting alteration of the reception data 1912.

The data format of an electronic certificate generally used in the above-described function is currently based on the standard X.509, that is, the standard specifications of a digital certificate defined by the ITU (International Telecommunications Union). An electronic certificate of the X.509 format includes an X.509 version number, the serial number of the electronic certificate, public key information, the identification information of the certificate authority that has issued the electronic certificate, the expiration date of the electronic certificate, the identification information of the subject to be certified (electronic certificate issue destination), and extension area.

To make the CA issue an electronic certificate, the subject of the electronic certificate issue destination sends, to the CA, data of a certificate issuing request format called CSR (Certificate Signing Request). The CA issues a certificate based on the contents described in the CSR. As the format of the CSR, a standard PKC#10 (RFC2986 Internet X.509 Certificate Request Message Format Version 1.7) is used. The CSR generally includes public key information held by the electronic certificate issue destination and the information of the subject to be certified (electronic certificate issue destination). When the CA should issue an electronic certificate to a printing apparatus, the printing apparatus generates a CSR including public key information held by it and the identification information of the printing apparatus and requests the CA to issue a certificate.

Such an MFP has a timer transmission function as one of the functions of transmitting an electronic document read by a-scanner by, for example, e-mail. With the timer transmission function, the MFP temporarily holds, in the storage unit, the data of a document scanned by its scanner, instead of immediately transmitting the document data after scanning. The user designates the transmission time and destination of the held document data so that the document data is transmitted to the designated destination at the designated time. At the designated time, the MFP converts the stored document data into a transmission file format such as PDF and transmits it to the designated destination.

If the timer transmission function is to be implemented by the electronic-signature-attached document data transmission function, the following problems are posed.

To add an electronic signature to document data, the MFP's or user's private key and an electronic certificate containing a public key paired with the private key are necessary. Hence, the MFP must hold the private key and electronic certificate for electronic signature creation in advance. The private key and electronic certificate are generally managed while enabling operations such as key pair or electronic certificate generation, registration, display, and deletion using a user interface such as the operation panel of the MFP. However, when timer transmission is set by the electronic-signature-attached document data transmission function, the private key and electronic certificate necessary for electronic signature addition may be deleted contrary to sender's intention. In this case, when the designated timer transmission date/time has come, no electronic signature can be added to the document data because the necessary private key and electronic certificate had been deleted. To prevent this, when timer transmission is set before deletion of the necessary private key and electronic certificate, the document data may be converted into the transmission file format, and an electronic signature may be created based on the converted file and added to the transmission file. In this case, however, the plurality of file formats are held until the transmission time in correspondence with the target document data, consuming an unnecessary storage area.

An electronic certificate used for an electronic signature has an expiration date until which the validity of the electronic certificate is guaranteed. For this reason, an electronic signature created by using an electronic certificate whose valid time has not started yet or an expired electronic certificate has no validity in itself. If document data with an electronic signature is transmitted by the timer transmission function at a designated date/time outside the valid time of the electronic certificate, the document data is transmitted together with an invalid electronic signature.

SUMMARY OF THE INVENTION

The present invention enables realization of a communication apparatus which transmits data with an appropriate electronic signature at a designated time when the data with the electronic signature is to be transmitted at the designated time.

One aspect of the present invention provides a communication apparatus having a function of transmitting data at a designated time, comprising: a storage unit configured to store generation information to be used for generating an electronic signature; a signature generation unit configured to generate the electronic signature by using the generation information; a delete unit configured to delete the generation information; a transmission reserving unit configured to reserve transmission of the data having the electronic signature generated by the signature generation unit; and a restriction unit configured to, when the transmission of the data having the generated electronic signature is reserved by the transmission reserving unit, restrict deletion of the generation information of the electronic signature added to the reserved data.

Another aspect of the present invention provides a communication apparatus having a function of transmitting data at a designated time, comprising: a storage unit configured to store generation information to be used for generating an electronic signature; a signature generation unit configured to generate an electronic signature by using the generation information; a transmission reserving unit configured to reserve a transmission so that the data having the electronic signature generated by the signature generation unit is transmitted at a designated time; a determination unit configured to determine whether the designated time is within a valid time of the generation information; and an notification unit configured to notify a user of a warning when the determination unit determines that the designated time is not within the valid time.

Still another aspect of the present invention provides a control method of a communication apparatus having a function of transmitting data at a designated time, comprising: generating an electronic signature by using generation information being stored in a memory and to be used for generating an electronic signature; deleting the generation information; reserving transmission of the data having the generated electronic signature; and restricting deletion of the generation information of the electronic signature added to the reserved data when the transmission of the data having the generated electronic signature is reserved.

Yet another aspect of the present invention provides a control method of a communication apparatus having a function of transmitting data at a designated time, comprising: generating an electronic signature by using generation being stored in a memory and to be used for generating an electronic signature; reserving a transmission so that the data having the generated electronic signature is transmitted at a designated time; determining whether the designated time is within a valid time of the generation information; and notifying a user of a warning when it is determined that the designated time is not within the valid time.

Still yet another aspect of the present invention provides a computer readable medium storing a program for controlling a communication apparatus having a function of transmitting data at a designated time, the program comprising: a code to generate an electronic signature by using generation information being stored in a memory and to be used for generating an electronic signature; a code to delete the generation information; a code to reserve transmission of the data having the generated electronic signature; and a code to restrict deletion of the generation information of the electronic signature added to the reserved data when the transmission of the data having the generated electronic signature is reserved.

Yet still another aspect of the present invention provides a computer readable medium storing a program for controlling a communication apparatus having a function of transmitting data at a designated time, the program comprising: a code to generate an electronic signature by using generation being stored in a memory and to be used for generating an electronic signature; a code to reserve a transmission so that the data having the generated electronic signature is transmitted at a designated time; a code to determine whether the designated time is within a valid time of the generation information; and a code to notify a user of a warning when it is determined that the designated time is not within the valid time.

Further features of the present invention will become apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
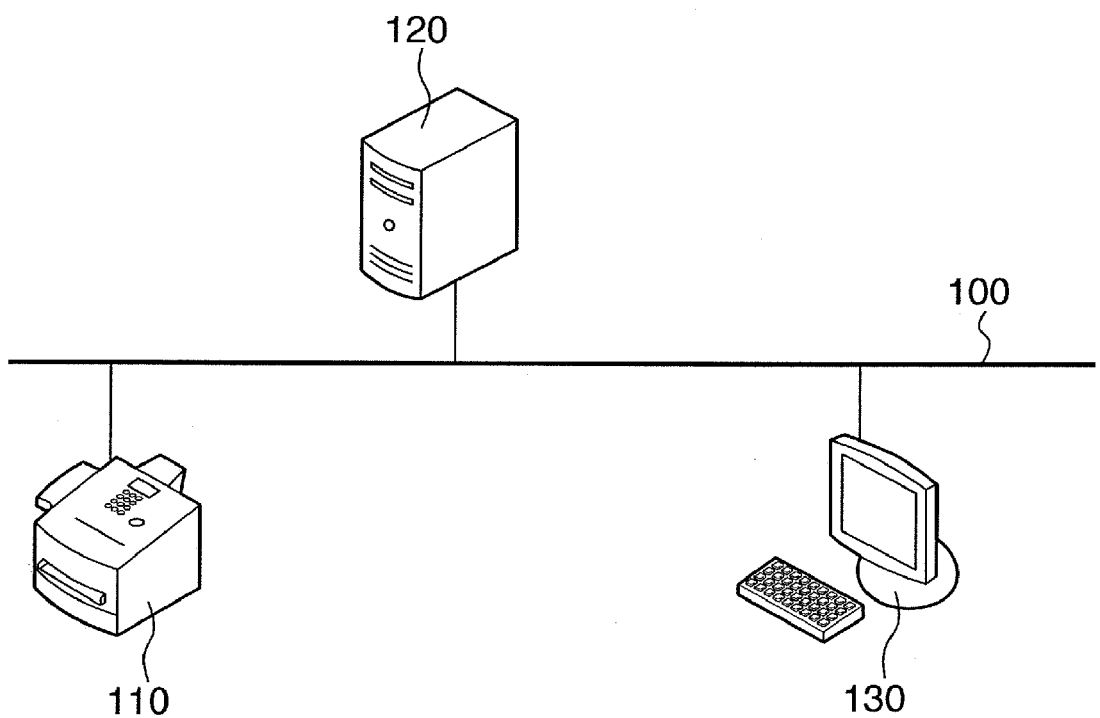
FIG. 1 is a view showing the arrangement of a network system according to an embodiment of the present invention.

FIG. 1 is a view showing the arrangement of a network system according to an embodiment of the present invention.

This network system includes an MFP (printing apparatus) 110, server apparatus 120, and client apparatus 130. The MFP 110, server apparatus 120, and client apparatus 130 are connected through a network 100 so that they can exchange data with each other. FIG. 1 illustrates only one MFP 110 and one client apparatus. However, the system may include a plurality of MFPs and a plurality of client apparatuses. The MFP 110 with a scanner can serve as both a copying machine and a network printer.

The MFP 110 can store, in its storage unit (HDD), an electronic document read by the scanner or an electronic document received via the network 100. The MFP 110 having an e-mail client (e-mail transmission) function can transmit an electronic document stored in its storage unit to another network device by e-mail. The MFP 110 has a public key encryption means to be used for an electronic signature or the like. The MFP 110 can also hold the private key of the user who uses the MFP 110, a public key, and an electronic certificate containing the public key. The MFP 110 also has a function of adding an electronic signature to an electronic document stored in the storage unit by using the private key, public key, and electronic certificate containing the public key when transmitting the electronic document to another network device by e-mail. The MFP 110 can also generate issuing request information of an electronic certificate containing a public key held by the MFP itself and request electronic certificate issue of the server apparatus 120 which executes a certificate authority service (CA service) on the network. The MFP 110 can acquire and hold an electronic certificate that is issued by the server apparatus 120 in response to the request.

The server apparatus 120 having an e-mail server function receives e-mail transmitted from a device on the network 100 and delivers the received e-mail to a designated destination. The server apparatus 120 also has a certificate authority service function of managing electronic certificate issue in the network 100. With the certificate authority service function, the server apparatus receives an electronic certificate issuing request from the MFP 110, issues an electronic certificate based on the issuing request, and transmits the issued electronic certificate to the MFP 110 of the request source.

The client apparatus 130 having an e-mail client (e-mail reception) function receives, from the server apparatus 120, e-mail that has a destination set to client apparatus 130.

In this embodiment, the control and communication protocols related to e-mail transmission/reception between the MFP 110, server apparatus 120, and client apparatus 130 are standard protocols SMTP (Simple Mail Transfer Protocol) and POP (Post Office Protocol). However, communication may be done using any other communication protocols. To transmit an electronic document to a device on the network, the MFP 110 may use file transfer by, for example, SMB (Server Message Block) protocol except e-mail or a communication protocol such as HTTP (Hyper Text Transfer Protocol) or FTP (File Transfer Protocol).

Figure 2:
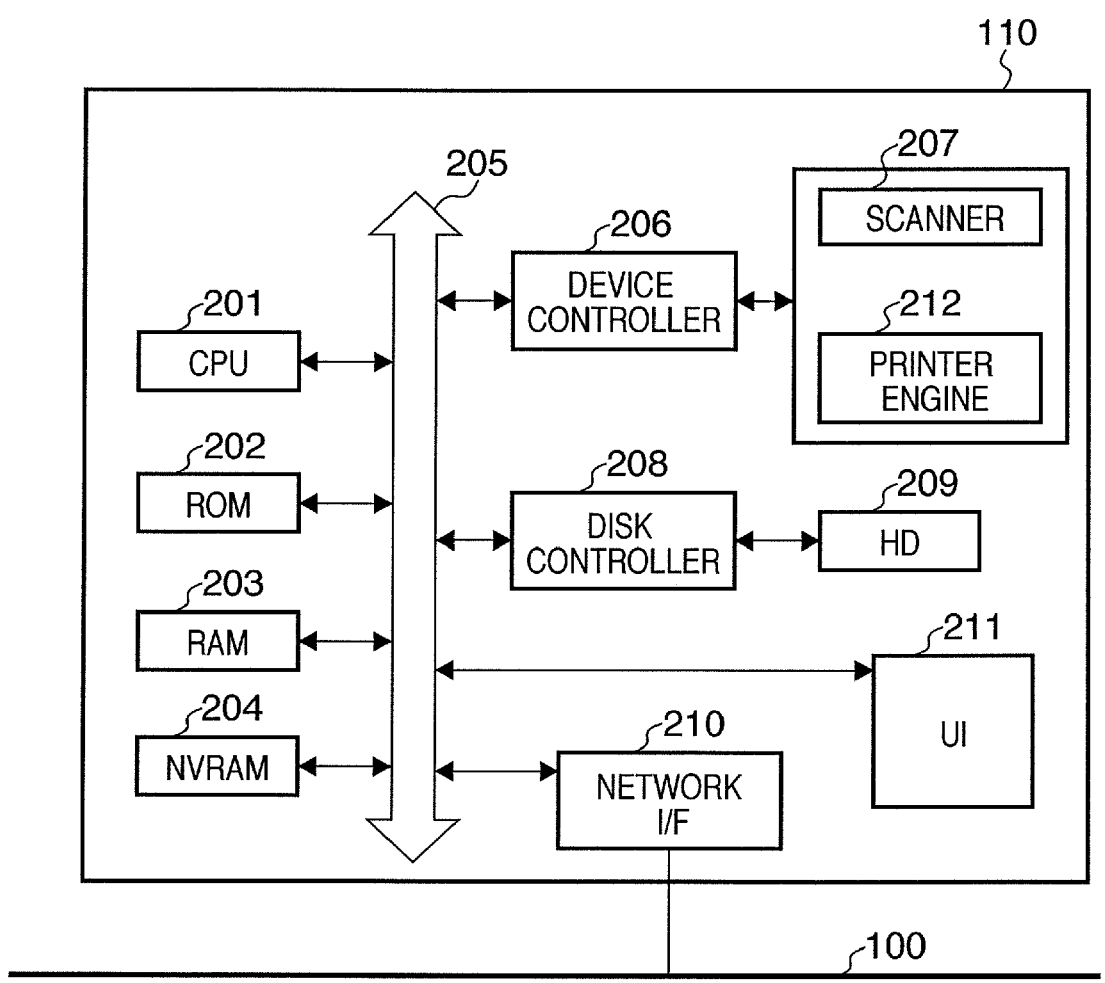
FIG. 2 is a block diagram showing the hardware configuration of a printing apparatus (MFP) according to the embodiment.

FIG. 2 is a block diagram showing the hardware configuration of the printing apparatus (MFP) 110 according to this embodiment.

A CPU (Central Processing Unit) 201 executes a device control program stored in a ROM (Read Only Memory) 202 or hard disk (HD) 209, thereby comprehensively controlling the units connected to a system bus 205. A RAM 203 functions as the main memory or work area of the CPU 201. An NVRAM 204 is a nonvolatile memory which holds various kinds of setting information and status information of the MFP 110. A device controller (DVC) 206 controls hardware devices (devices) such as a scanner 207 and printer engine 212 related to, for example, the image reading and printing functions of the MFP 110. A disk controller (DKC) 208 controls access to the hard disk 209. The hard disk 209 stores spooled print data and application programs to execute device control and functions according to the embodiment. The hard disk 209 also stores the private key of the MFP 110 or the user who uses the MFP 110, a public key, and an electronic certificate containing the public key. Each program stored in the hard disk 209 is loaded to the RAM 203 and executed. A network interface card (NIC) 210 bidirectionally exchanges data with a network printer or other network devices through the LAN (Local Area Network) 100. A UI (User Interface) 211 having a touch panel display screen and various kinds of keys and buttons can instruct the MFP 110 to execute setting and printing or transmit an electronic document with an electronic signature by e-mail.

Figure 3:
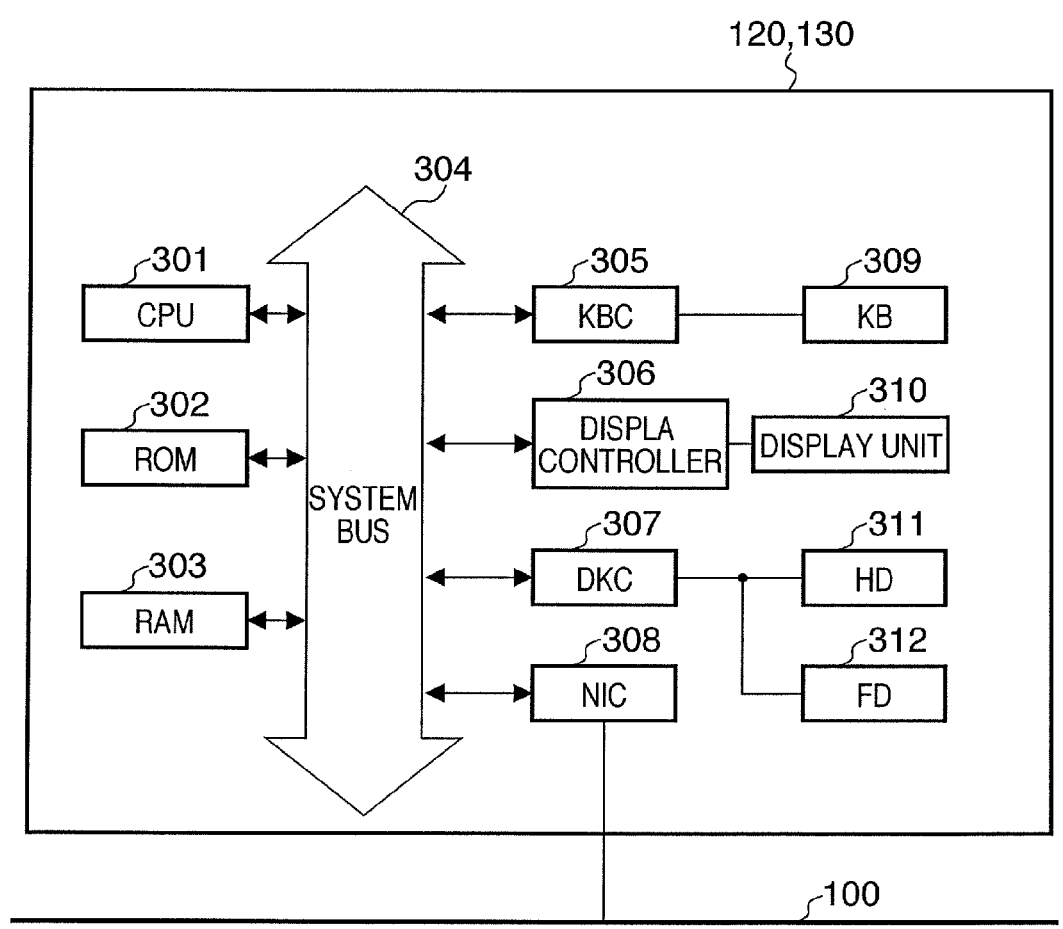
FIG. 3 is a block diagram showing the hardware configuration of a server apparatus or client apparatus according to the embodiment.

FIG. 3 is a block diagram showing the hardware configuration of the server apparatus 120 or client apparatus 130 according to this embodiment. In this embodiment, the server apparatus 120 and client apparatus 130 have the same hardware configuration that is the same as that of a common PC but different control programs.

A CPU 301 loads, to a RAM 303, a program stored in a ROM 302 or hard disk (HD) 311 or supplied from a removable medium such as a Floppy® disk (FD) 312. The CPU 301 executes the program loaded to the RAM 303, thereby comprehensively controlling the units connected to a system bus 304. The CPU 301 and an application program stored in the ROM 302 or hard disk (HD) 311 constitute a means serving as an e-mail server or e-mail client according to this embodiment. Note that each program installed in the HD 311 is loaded to the RAM 303 and executed under the control of the CPU 301. The RAM 303 functions as the main memory or work area of the CPU 301. A keyboard controller (KBC) 305 controls instruction input from a keyboard (KB) 309 or pointing device (not shown). A display controller 306 controls display on a display unit 310. A disk controller (DKC) 307 controls access to the hard disk (HD) 311 and a removable medium such as the Floppy® disk (FD) 312. The HD 311 stores, for example, a boot program (activation program), a plurality of applications, service applications, system files, and a network management program. A network interface card (NIC) 308 bidirectionally exchanges data with a network printer or other network devices through the network 100.

Figure 4:
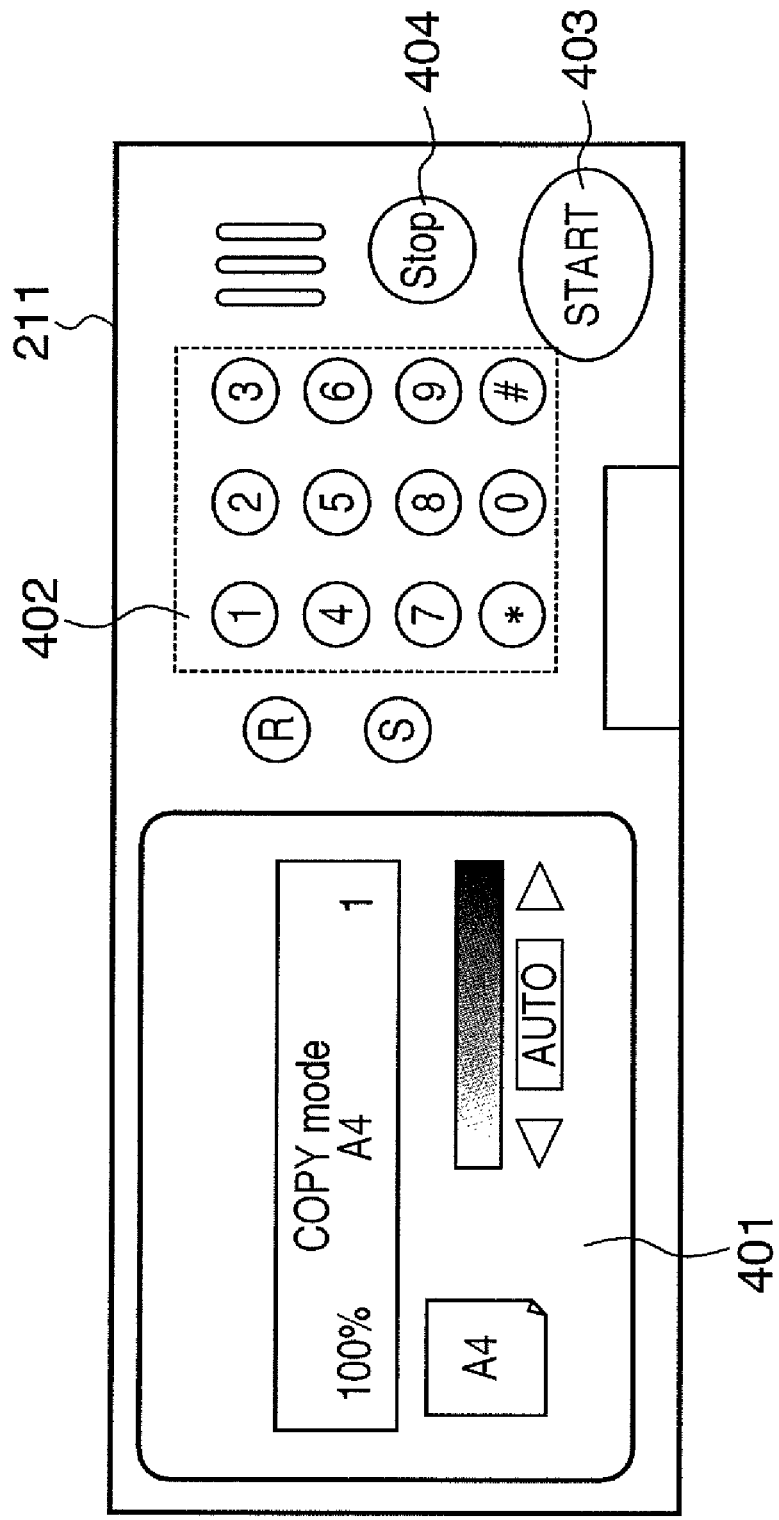
FIG. 4 is a view showing the arrangement of an operation panel that forms the UI of the MFP according to the embodiment.

FIG. 4 is a view showing the arrangement of an operation panel that forms the user interface 211 of the MFP 110 according to this embodiment.

A touch panel 401 can display messages and the like and also input operation instructions and various settings in accordance with the user's touch operation. FIG. 4 illustrates a window in a copy standby mode. In this example, the copy size is A4, the density setting is "auto", the scaling factor is "100%", and the number of copies is "1". A numeric keypad 402 is used to input numbers "1" to "9" and "0". When the user presses a service button S, various kinds of service windows are displayed on the touch panel 401, and the user can give the instruction for a service except copy. When the user presses a setting button R, various kinds of setting windows are displayed on the touch panel 401, and the user can set various parameters while observing the windows. The user presses a start button 403 to instruct to start various operations such as copy and scan. The user presses a stop button 404 to give the instruction to stop various operations such as copy and scan.

Instructions for processes such as electronic document transmission according to this embodiment are given by operating the touch panel 401 and the buttons.

Figure 5A:
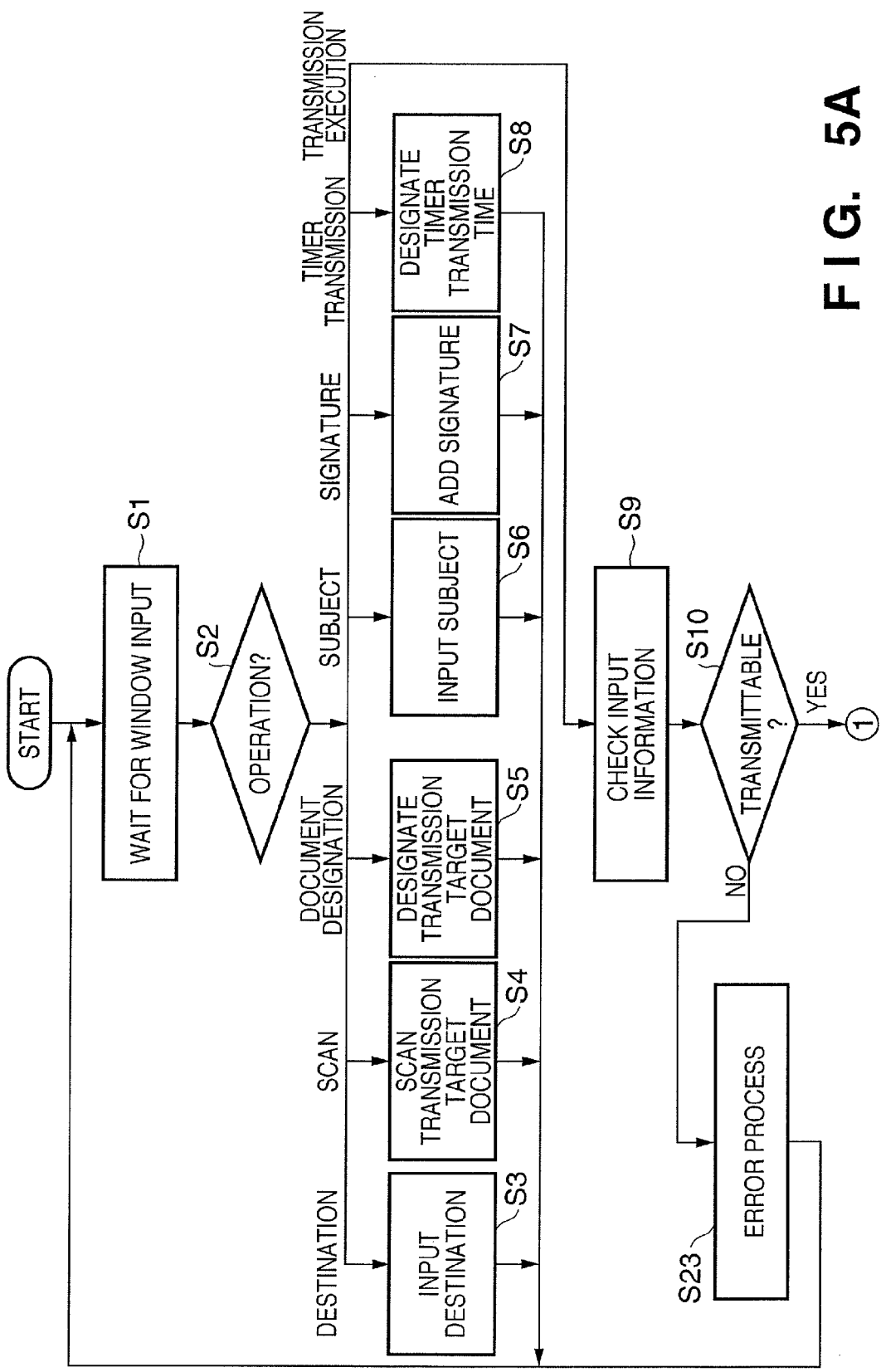
FIGS. 5A-B are flowcharts for explaining the operation of the electronic-signature-attached electric document transmission function of an MFP according to the first embodiment of the present invention.
Figure 5B:
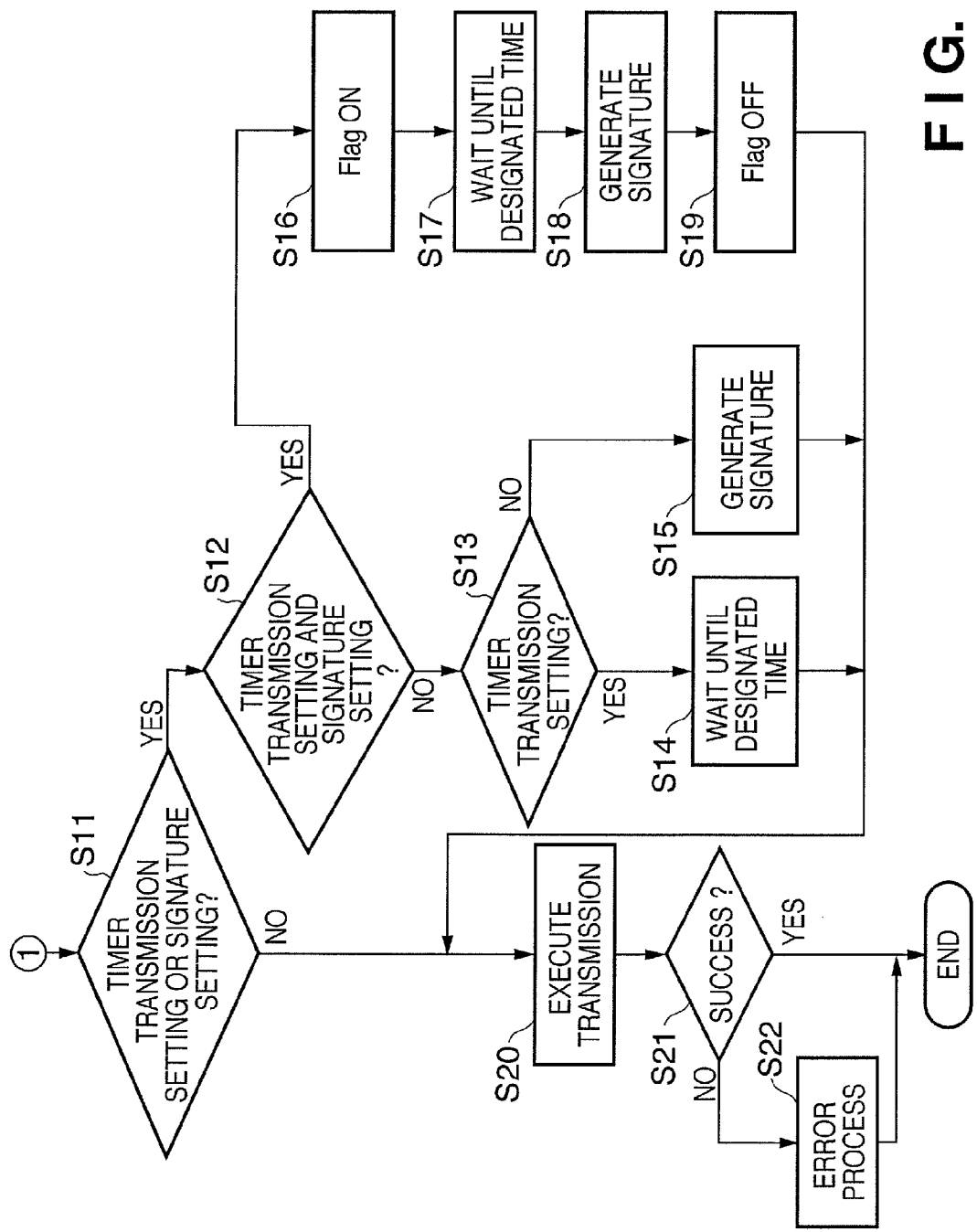

FIGS. 5A-B are flowcharts for explaining the operation of an electronic-signature-attached electric document transmission function of the MFP 110 according to this embodiment. A program to execute this process is stored in the ROM 202 or hard disk 209 and executed under the control of the CPU 201.

Figure 6:
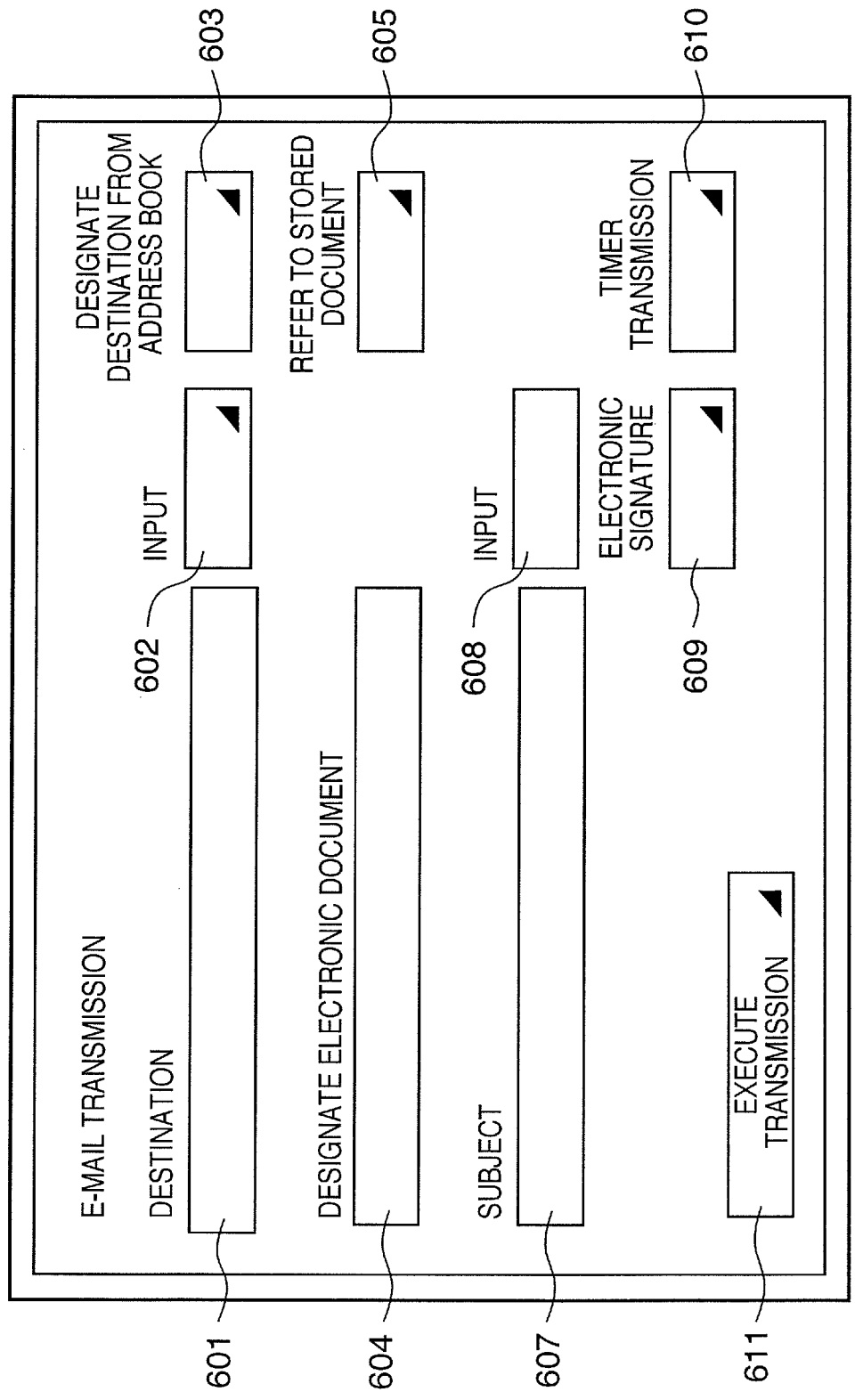
FIG. 6 is a view showing an example of a user interface window for setting the electronic-signature-attached electric document transmission function of the MFP according to the embodiment.

The user who wants to transmit an electronic document from the MFP 110 presses the service button S of the user interface of the MFP 110. An electronic-signature-attached electric document transmission function operation window shown in FIG. 6 is displayed. The user executes an operation by touching the touch panel 401 or pressing various buttons.

In this embodiment, the MFP 110 can transmit e-mail of an electronic document with an electronic signature to the server apparatus 120 serving as an e-mail server. The e-mail client application of the client apparatus 130 can receive the e-mail. In the MFP 110 that should transmit the e-mail, various kinds of settings (the SMTP server address of the server apparatus 120 and information about SMTP authentication) related to e-mail transmission of the MFP 110 are executed in advance. In setting, the user presses the setting button R of the user interface 211 to display an e-mail setting window on the touch panel 401 and sets various kinds of information in accordance with the setting window.

FIG. 6 is a view showing an example of a user interface window for setting the electronic-signature-attached electric document transmission function of the MFP 110 according to this embodiment.

Referring to FIG. 6, the user inputs the destination of e-mail to a field 601. The user presses an input button 602 to input the destination to the destination field 601. When the user presses the input button 602, a keyboard to input characters and the like is displayed on the touch panel 401. The user presses a button 603 to designate a destination in an address book. When the user presses the button 603, an address book is displayed on the touch panel 401. The user designates a destination included in the address book, thereby completing destination input to the destination field 601. The user designates, in a field 604, a transmission target document from electronic documents stored in the storage unit (hard disk 209). When the user presses an electronic document reference button 605, a list of electronic documents stored in the storage unit is displayed on the touch panel 401. The user can designate a transmission target document by designating a specific electronic document in the displayed electronic document list. When the user presses a file format button, file formats are displayed in a pull-down menu. The user can select a file format to be transmitted. For the file format, a default value may be set in advance, as shown in FIG. 6. The user inputs the title (subject) of the transmission target document to a subject input field 607. The user presses an input button 608 to input the title of the transmission target document. The function of the input button 608 is the same as that of the above-described input button 602. A button 609 is pressed to give the instruction to add an electronic signature to the transmission target document. A button 610 is used to designate timer transmission. The user presses a transmission execution button 611 to immediately transmit the document.

The operation of the MFP 110 will be described next with reference to the flowcharts in FIGS. 5A-B.

Assume that the MFP 110 displays the electronic-signature-attached electric document transmission function operation window at the start of the process. In step S1, the MFP 110 waits for input from the user interface 211. If information of some kind is input (input operation is executed), the process advances to step S2. In step S2, the MFP 110 determines the type of the input operation. If it is determined that a destination input operation is executed, the process advances to step S3 to store, in the RAM 203, an e-mail address input as destination information. When the destination input process finishes, the process returns to input wait in step S1.

To input destination information in step S3, the user presses the input button 602 in FIG. 6. Then, a soft keyboard is displayed on the touch panel 401. The user can input a destination e-mail address by using the soft keyboard. In this embodiment, e-mail addresses can be held in an address book. Hence, it is also possible to designate, as destination information, an e-mail address held in the address book. E-mail addresses held in the address book are stored in the NVRAM 204 or hard disk 209, and the information is read out as needed. To select a destination e-mail address from the address book, the user presses the button 603. When the button 603 is pressed, the e-mail addresses stored in the NVRAM 204 or hard disk 209 are read out, and the list of the readout e-mail addresses is displayed on the touch panel 401. When the user selects an e-mail address to be designated as a destination from the thus displayed e-mail address list, the selected e-mail address is selected as a destination.

Figure 7:
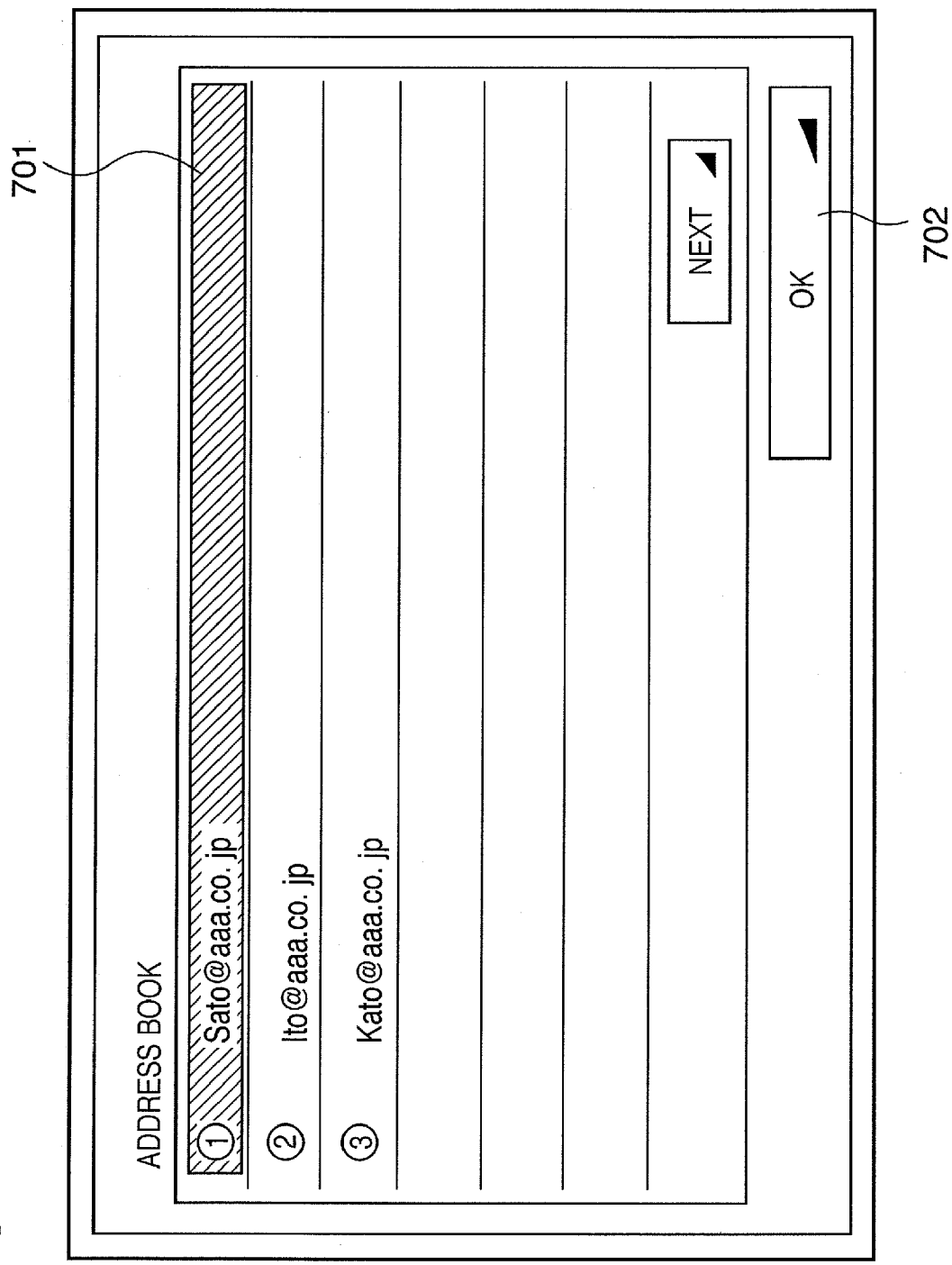
FIG. 7 is a view showing a state wherein the contents of an address book are displayed in a list, and an address 701 is selected.

FIG. 7 is a view showing a state wherein the contents of the address book are displayed, and an e-mail address 701 is selected.

When the user presses an OK button 702, the selected e-mail address 701 is determined as a destination. The display returns to the initial window (FIG. 6), and the address "sato@aaa.co.jp" is displayed in the destination field 601.

If it is determined in step S2 that original document scanning by the scanner 207 is instructed, the process advances to step S4 to make the device controller 206 control the scanner 207. The scanner 207 scans an original document placed on it. The RAM 203 holds the electronic data (to be referred to as an electronic document hereinafter) of the scanned original document. When the process in step S4 finishes, the process returns to step S1.

To give the instruction for scanning of the original document, the user places the original document on the scanner 207 of the MFP 110 and presses the start button 403. In this embodiment, the MFP 110 stores, in the hard disk 209, the electronic document of the scanned original document or an electronic document received from an external device through the network 100. The user can also designate an electronic document held in the MFP 110 as a transmission target document.

If it is determined in step S2 that an operation of designating a transmission target document is executed, the process advances to step S5 to read out the designated electronic document and store it in the RAM 203 as a transmission target document. To designate a transmission target document, the user presses the reference button 605 in FIG. 6. When the reference button 605 is pressed, the MFP 110 reads out the list of electronic documents stored in the hard disk 209 and displays the list on the touch panel 401. The MFP 110 according to this embodiment holds not only the electronic documents themselves but also, as management information, index information such as the document name, paper size, page count, and saving date/time of each electronic document. When displaying the electronic document list, the MFP can read out index information corresponding to each electronic document and display it.

Figure 8:
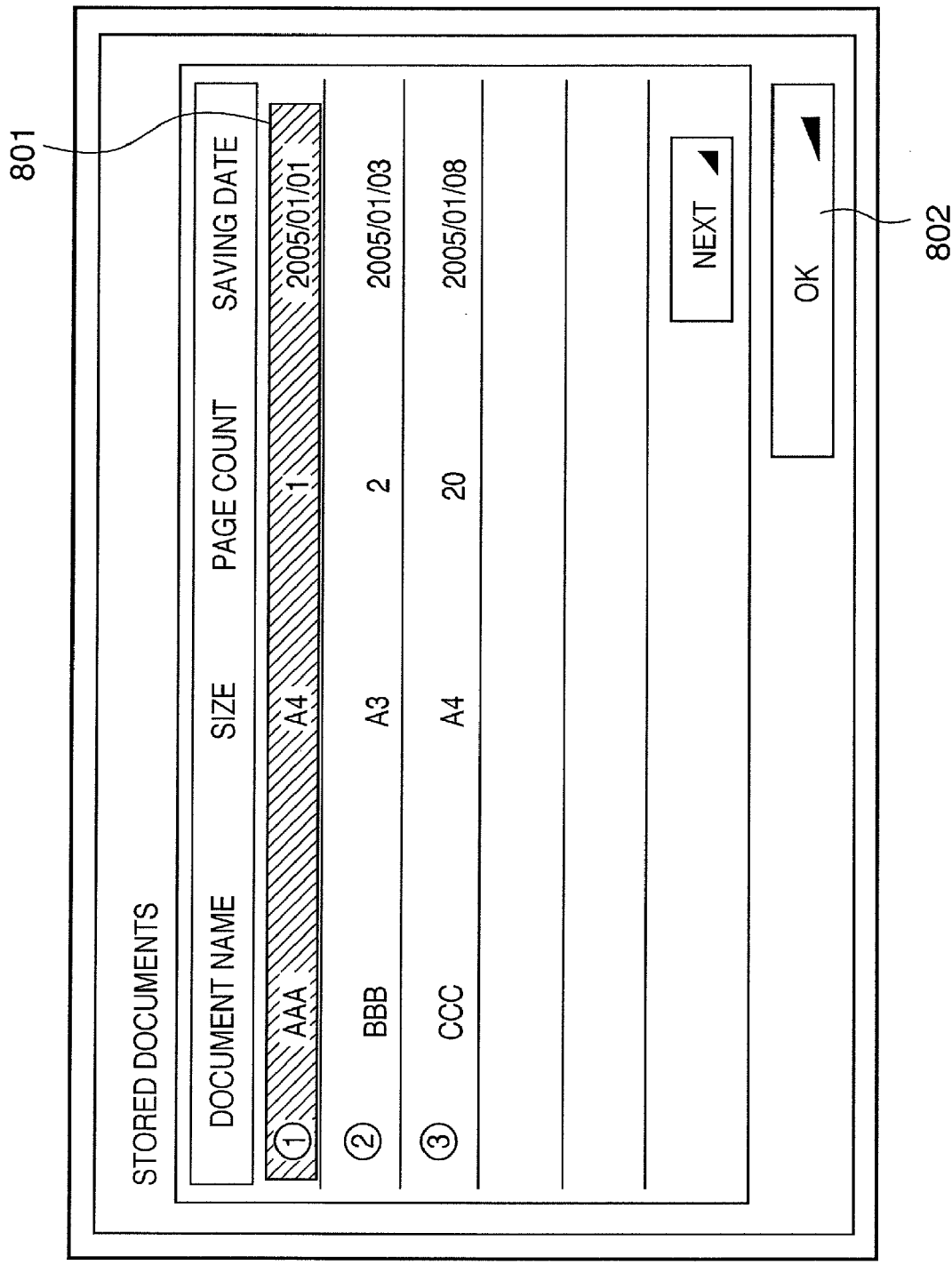
FIG. 8 is a view showing a state wherein a document (AAA) 801 is selected from a displayed list of document names.

FIG. 8 is a view showing a state wherein an electronic document (document name is "AAA") 801 is selected from a thus displayed electronic document list.

When the user designates an electronic document to be transmitted from the displayed electronic document list and presses an OK button 802, the electronic document is designated as a transmission target document, and the display returns to the initial window shown in FIG. 6. In this case, the document name of the designated electronic document is displayed in the electronic document designation field 604 in FIG. 6. After that, when the user presses the file format button, PDF, TIFF, and JIF are displayed in a pull-down menu as transmittable file formats, and the user can select one of them. The file formats are not limited to PDF, TIFF, and JIF.

If it is determined in step S2 that a subject input operation is executed, the process advances to step S6 to hold information representing the input subject (subject of e-mail) in the RAM 203. When this process finishes, the process returns to the input wait window display in step S1. To input the subject in step S6, the user presses the input button 608. Then, a soft keyboard is displayed on the touch panel 401. The user inputs the subject by pressing the keys of the soft keyboard.

Figure 9:
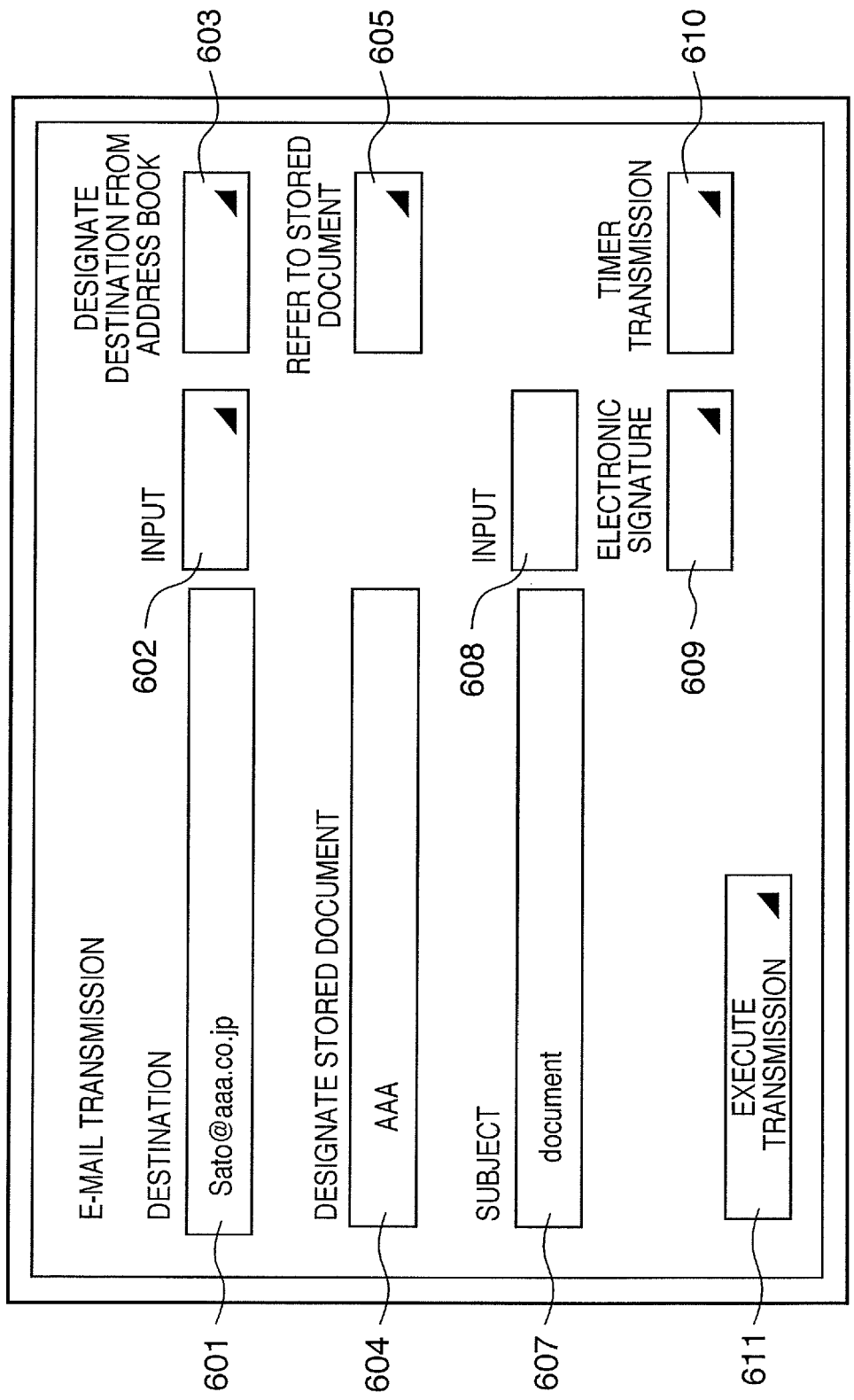
FIG. 9 is a view showing an example of input wait window display in which designation of a destination and transmission target document and input of a subject are ended.

FIG. 9 is a view showing an example of input wait window display in which designation of a destination and transmission target document and input of a subject are ended. The same reference numerals as in FIG. 6 denote the same parts in FIG. 9.

In this example, the address designated in FIG. 7 is set in the destination field 601. The document name of the electronic document selected in FIG. 8 is set in the electronic document designation field 604. Additionally, "document" representing a document is set in the subject input field 607.

If it is determined in step S2 that the electronic signature button 609 is designated, the process advances to step S7. As described above, the MFP 110 can hold a plurality of private keys, public keys, and electronic certificates containing public keys to be used to add an electronic signature to an electronic document in the NVRAM 204 or hard disk 209.

In step S7, when the user designates keys and an electronic certificate to be used for an electronic signature, electronic signature addition to the electronic document to be transmitted is set. When the keys and electronic certificate to be used for an electronic signature are designated, the RAM 203 holds information to identify the keys and electronic certificate. When this process finishes, the process returns to wait for window input in step S1.

To give the instruction for addition of an electronic signature, the user presses the electronic signature button 609 in FIG. 6. When the electronic signature button 609 is pressed, the keys and electronic certificates stored in the NVRAM 204 or hard disk 209 are read out. A key/certificate list is displayed on the touch panel 401 based on the readout keys and electronic certificates.

Figure 11:
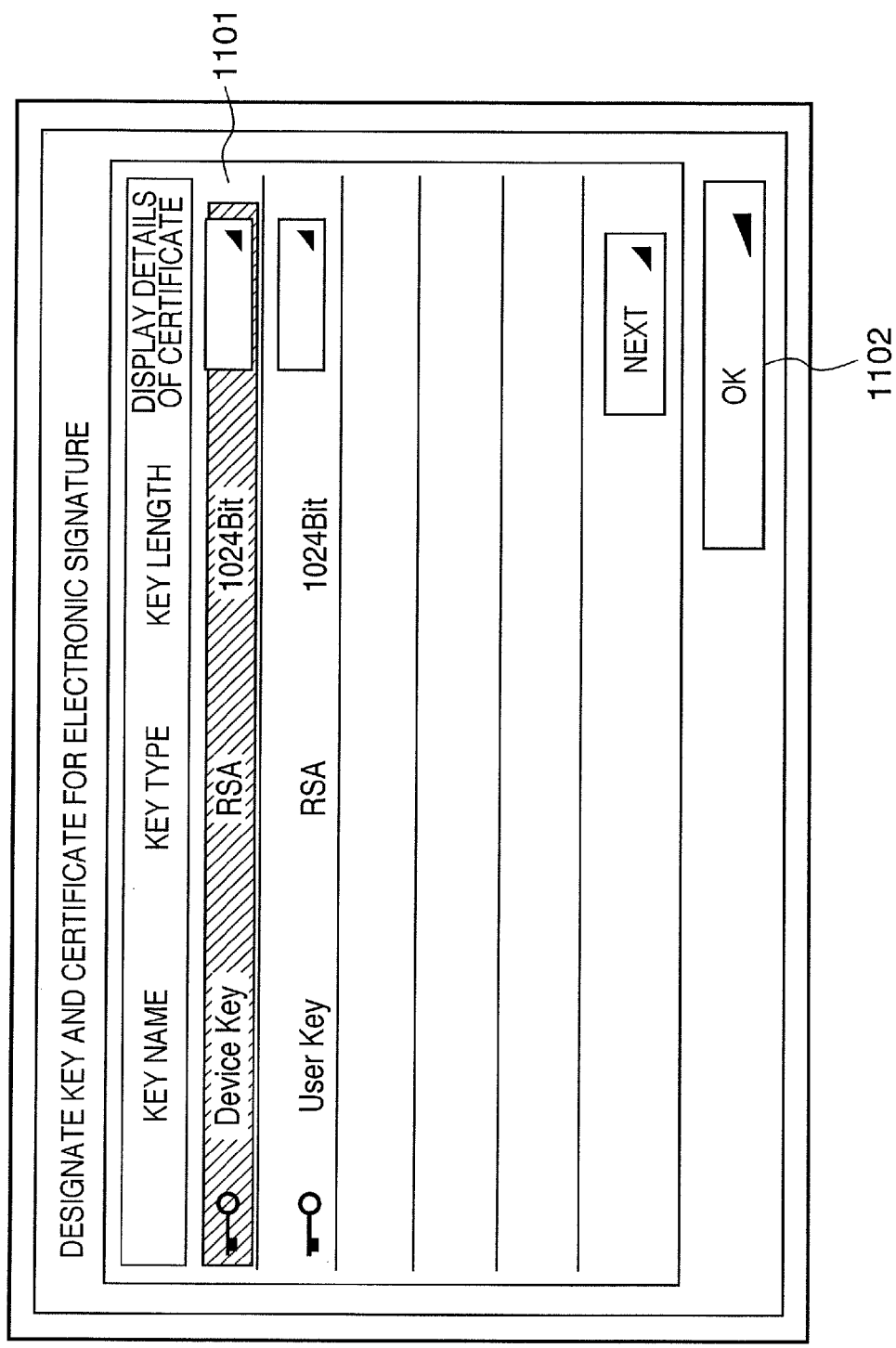
FIG. 11 is a view showing a display example of a state wherein a key and certificate information to be used for an electronic signature are selected from a displayed list of keys and certificate information.

FIG. 11 is a view showing a display example of the key/certificate list. In this embodiment, the name (key name), key type (public key algorithm), and key bit length (key length) of each pair of private key and public key are displayed in the list. Details display buttons are added to the list to display the detailed information of each electronic certificate related to a pair of private key and public key.

Figure 10:
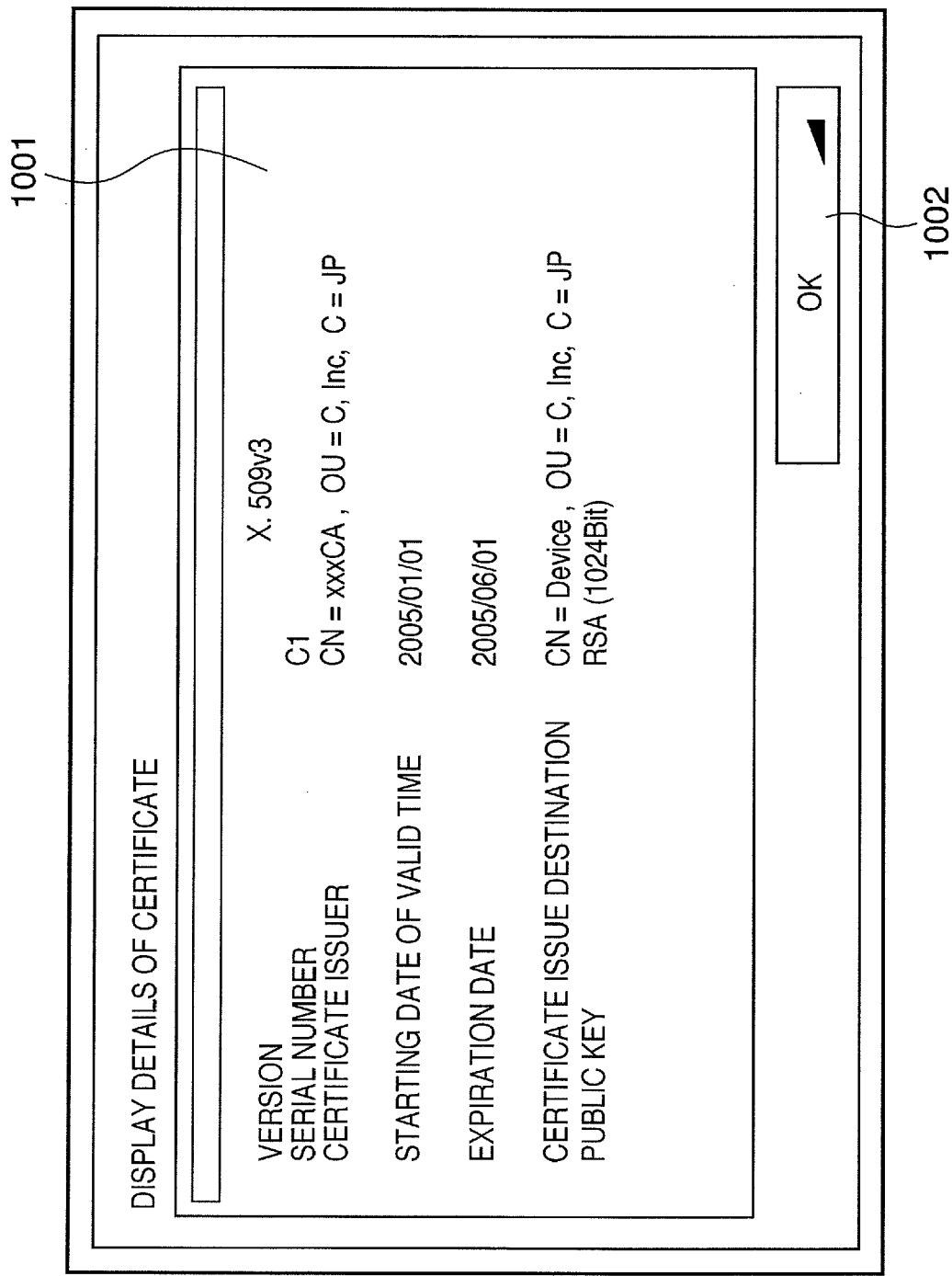
FIG. 10 is a view showing a display example of an electronic certificate details window when a certificate details display button is pressed.

FIG. 10 is a view showing a display example of an electronic certificate details window when the details display button is pressed.

In this embodiment, pieces of information such as the version, serial number, and issuer of an electronic certificate, the name of a certificate issue destination, and the starting date of the valid time and the expiration date are displayed in an electronic document details window 1001. When the user presses an OK button 1002, the display returns to the key/certificate list.

FIG. 11 is a view showing a display example of a state wherein a key and electronic certificate to be used for an electronic signature are selected from the displayed key/certificate list.

As shown in FIG. 11, a key and electronic certificate 1101 are selected. When the user designates an OK button 1102, the selected key and electronic certificate are set as a key and electronic certificate to be used for an electronic signature, and the display returns to the preceding window (FIG. 6 or 9). At this time, the MFP 110 holds, in the RAM 203, information to identify the selected key and electronic certificate. The key and electronic certificate indicate generation information to generate an electronic signature.

If it is determined in step S2 that the user presses the timer transmission button 610 to instruct timer transmission, the process advances to step S8 to input the date/time (time) of timer transmission. The RAM 203 holds information representing the input date/time. When this process finishes, the process returns to wait for window input in step S1.

To give the instruction for timer transmission, the user presses the timer transmission button 610 in FIG. 6. When the timer transmission button 610 is pressed, a timer transmission setting window shown in FIG. 12 is displayed on the touch panel 401.

Figure 12:
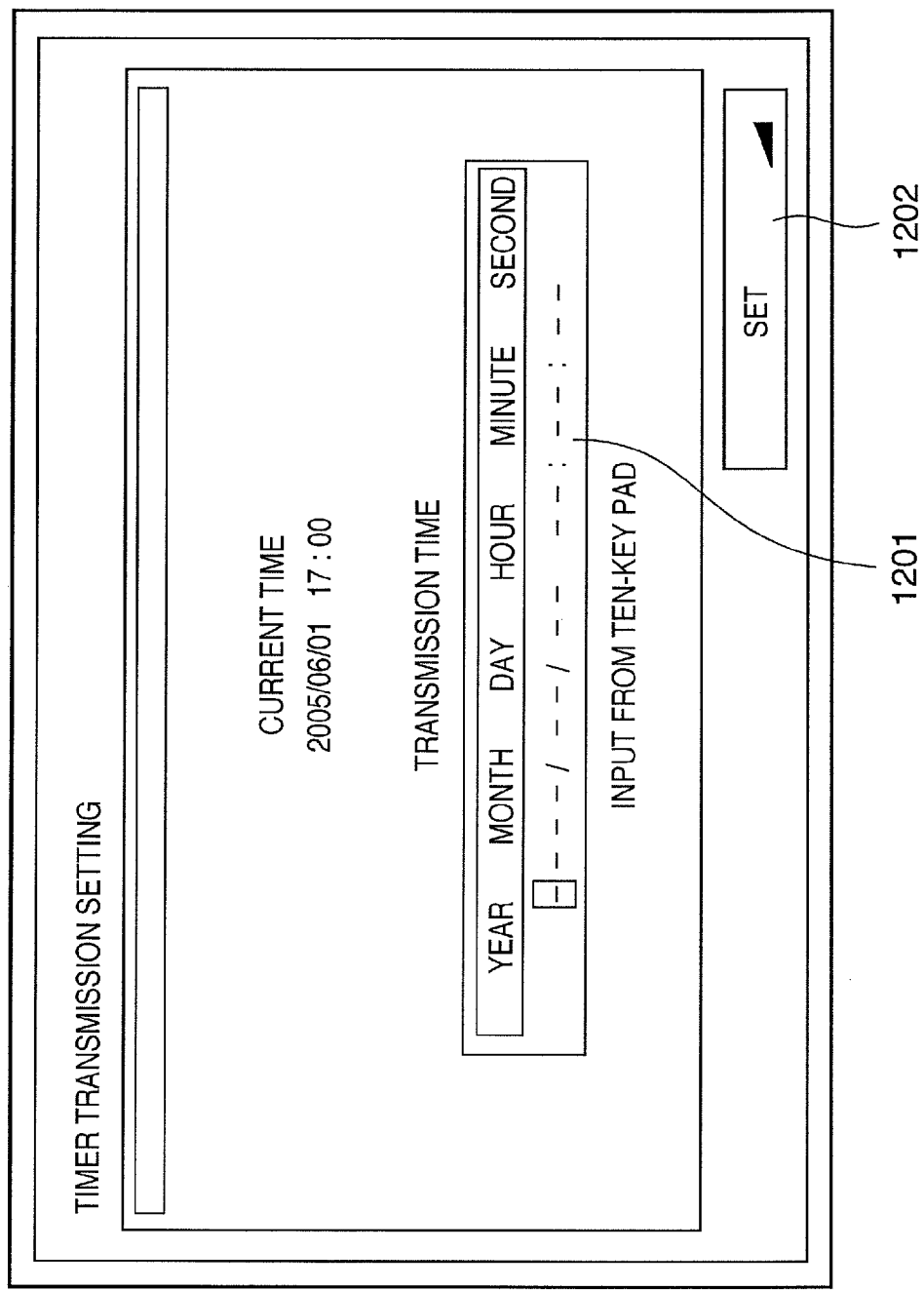
FIG. 12 is a view showing an example of a window for setting timer transmission.

FIG. 12 is a view showing an example of a window for setting the date/time of timer transmission.

The user inputs the transmission date/time to the window by using the numeric keypad 402 of the user interface 211. The input date/time is displayed in an input field 1201. When date/time input is ended, the user presses an SET button 1202.

The input date/time is set as a date/time to execute timer transmission. The process returns to step S1, and the display returns to the initial window.

If it is determined in step S2 that a transmission execution instruction is input, the process advances to step S9 to determine whether all pieces of information necessary for transmission are input. The pieces of determination target information in step S9 include the destination information in step S3 and the information of a transmission target document in step S4 or S5. In step S10, if it is determined in step S9 that all pieces of information necessary for transmission are input, the process advances to step S11. If not all pieces of information necessary for transmission are input, the process advances to step S23 to display an error window. The process returns to step S1. In this case, the error window displays a message "You still need to input information necessary for transmission" and also displays a necessary item. For example, a message "please input destination" is displayed. When the user presses an OK button in this window, the display returns to the input window shown in FIG. 6.

In step S11, it is determined whether electronic signature addition is set in step S7 or whether timer transmission is set in step S8. If neither process is set, the electronic document designated as a transmission target document is read out from the hard disk, converted into the file format designated in step S5, and held in the RAM 203. The process advances to step S20. If one of the processes is set, the process advances to step S12. In step S20, e-mail having the electronic document as an attached file is transmitted in accordance with the SMTP protocol and the information set and stored in the RAM 203 before step S20. In step S21, it is determined whether e-mail transmission has succeeded. If the transmission has succeeded, the process is ended. If the transmission has failed, the process advances to step S22 to display an error window, and the process is ended. This error window displays a message "Transmission has failed" as error contents.

In step S12, it is determined whether both electronic signature addition and timer transmission are set. If only one of them is set, the process advances to step S13. If both are set, the process advances to step S16. In step S13, it is determined whether timer transmission is set. If it is determined that timer transmission is set, the process advances to step S14 to temporarily stop the process until the date/time designated in step S8. At the designated date/time, the electronic document designated as a transmission target document is read out from the hard disk, converted into the file format designated in step S5, and held in the RAM 203. The process advances to step S20 to transmit e-mail. If it is determined in step S13 that timer transmission is not set, the electronic document designated as a transmission target document is read out from the hard disk, converted into the file format designated in step S5, and held in the RAM 203. The process advances to step S15 to generate an electronic signature to be added to the electronic document. After the electronic signature data is added to the electronic document data, the process advances to step S20 to transmit e-mail.

If both of electronic signature addition and timer transmission are set, the process advances to step S16 to turn on a flag representing that timer transmission of an electronic document with an electronic signature is being executed. Based on the flag value in the NVRAM 204, deletion of an electronic certificate related to a pair of private key and public key is restricted. The process advances to step S17 to temporarily stop the process until the date/time designated in step S8. At the designated date/time, the electronic document designated as a transmission target document is read out from the hard disk, converted into the file format designated in step S5, and held in the RAM 203. In step S18, an electronic signature for the electronic document to be transmitted is generated by using the key and electronic certificate (generation information to generate an electronic signature) selected in step S7. After the electronic signature is added to the electronic document, the process advances to step S19 to clear the flag value set in step S16 and the key and certificate stored in a predetermined area of the RAM 203. The process advances to step S20 to transmit e-mail.

Figure 13:
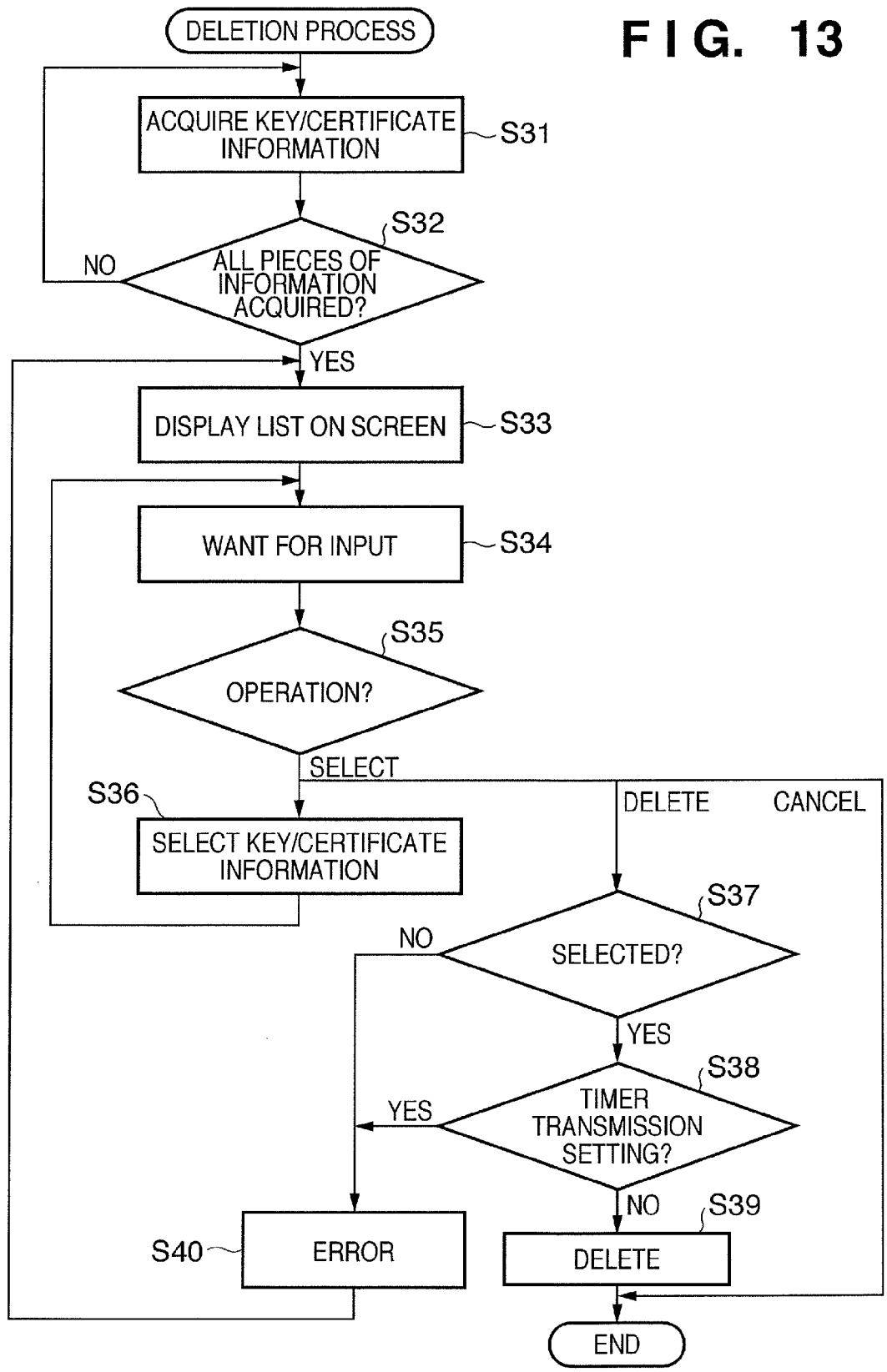
FIG. 13 is a flowchart for explaining a manipulation and operation of deleting key/certificate information representing a private key, public key, and electronic certificate containing the public key, which are to be used for an electronic signature in the MFP according to the first embodiment.

FIG. 13 is a flowchart for explaining a manipulation and operation of deleting a private key, public key, and electronic certificate containing the public key, which are to be used for an electronic signature in the MFP 110 according to this embodiment. A program to execute this process is stored in the ROM 202 or hard disk 209 and executed under the control of the CPU 201.

The user who wants to delete a key and electronic certificate presses the service button S of the user interface 211 of the MFP 110. The MFP 110 displays a key/electric certificate list.

Figure 14:
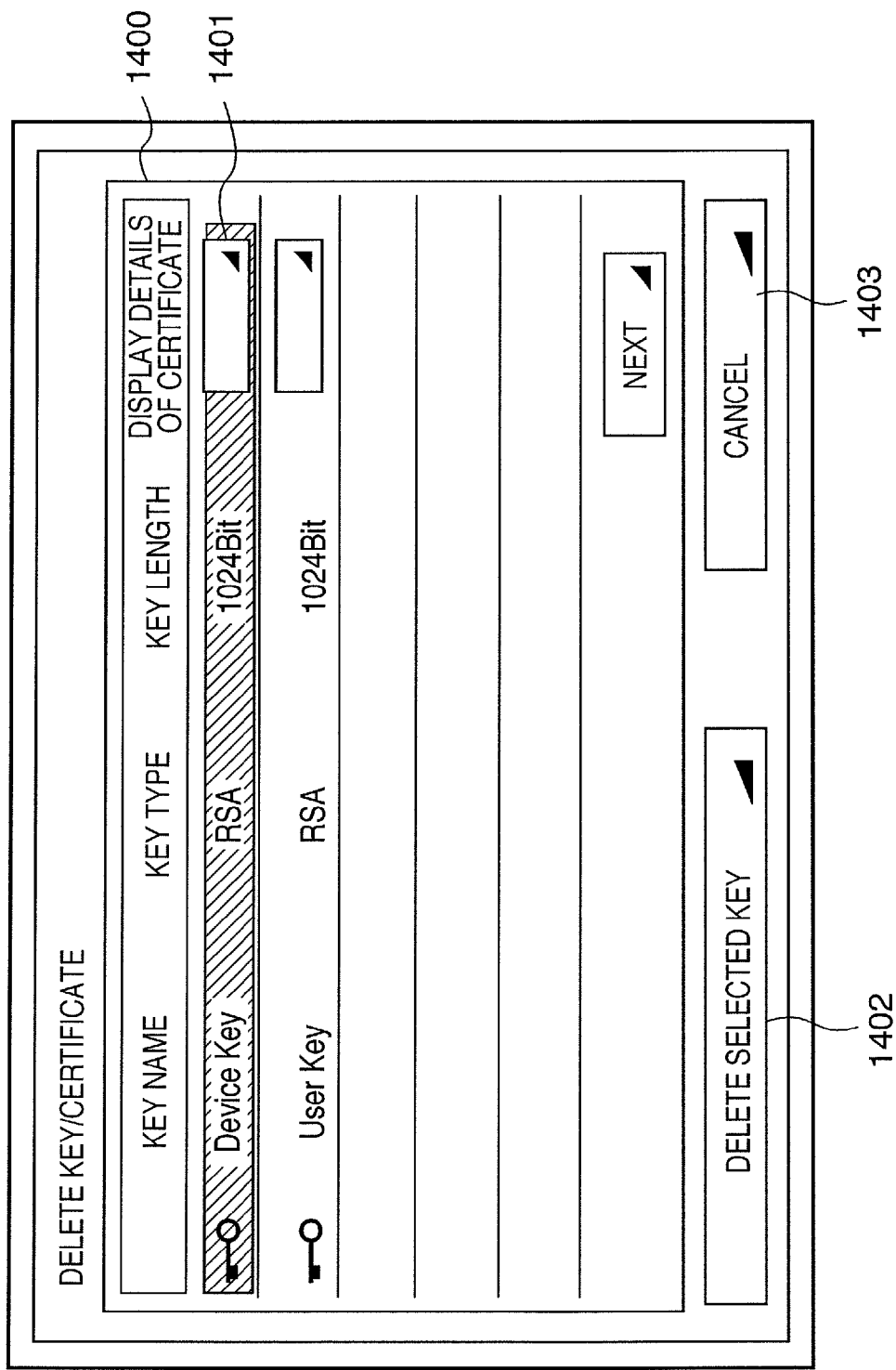
FIG. 14 is a view showing a state wherein pieces of key/certificate information are displayed, and information 1401 is selected.

FIG. 14 is a view showing a state wherein the key/electric certificate list is displayed, and information 1401 is selected.

In step S31, the MFP 110 reads out keys and electronic certificates stored in the NVRAM 204 or hard disk 209. The MFP 110 according to this embodiment can hold a plurality of keys and electronic certificates. Hence, the process in steps S31 and S32 is repeated until all held keys and electronic certificates are acquired in step S32. When all keys and electronic certificates are acquired, the process advances from step S32 to step S33 to display a list 1400 (FIG. 14) on the touch panel 401 based on the readout information. Although the key and electronic certificate (information 1401) are selected in FIG. 14, no selection is displayed in the initial window.

In this embodiment, the name (key name), key type (public key algorithm), and key length of each pair of private key and public key are displayed in the list. When the user presses a details display button on the list, the detailed information of a corresponding electronic certificate related to a pair of private key and public key can be displayed in the electronic certificate details window shown in FIG. 10.

In this embodiment, pieces of information such as the version, serial number, and issuer of an electronic certificate, the name of a certificate issue destination, and the starting date of the valid time and the expiration date are displayed in the electronic document details window 1001. When the user presses the OK button 1002, the display returns to the key/electronic certificate list.

The process advances to step S34 to wait for input from the touch panel 401. When an operation is executed, the process advances to step S35 to determine the type of operation. If a key and electronic certificate designation operation is executed in step S35, the designated key and electronic certificate are selected, as shown in FIG. 14. In FIG. 14, selection of a key and electronic certificate is displayed, as indicated by 1401. The process returns to input wait in step S35. On the other hand, if it is determined in step S35 that a delete button 1402 is pressed, the process advances to step S37 to determine whether a key and electronic certificate as a deletion target are selected. If a key and electronic certificate as a deletion target are selected, the process advances to step S38. If no deletion target is selected, the process advances to step S40. In step S40, a message "No key/electric information is selected" is displayed by an error process. When the user presses an OK button in the error window, the process returns to the process in step S33.

If a key and electronic certificate as a deletion target are selected, the process advances to step S38. In step S38, the MFP 110 refers to the flag value which is set and stored in the NVRAM 204 in step S16 of FIGS. 5A-B and the information which is held in step S7 of FIG. 6 to identify a key and electronic certificate. It is determined whether timer transmission using the key and electronic certificate selected in step S36 is set. If it is determined that timer transmission using the key and electronic certificate selected in step S36 is set, the process advances to step S40 to display an error window. A delete restriction message "It is impossible to delete the key/electric certificate information because timer transmission using the information is set" is displayed by an error process. When the user presses an OK button in the error window, the process returns to the process in step S33.

If it is determined that timer transmission using the key and electronic certificate selected in step S36 is not set, the process advances to step S39 to delete the key and electronic certificate stored in the NVRAM 204 or hard disk 209, and the process is ended.

If it is determined in step S35 that a "cancel" button 1403 is pressed, the process is immediately ended.

As described above, according to the first embodiment, when an electronic signature should be added to an electronic document to be timer-transmitted, and an instruction to delete the key and electronic certificate to be used for the electronic signature is input, the deletion process is restricted. This prevents deletion of the private key and electronic certificate necessary for adding the electronic signature to the electronic document to be timer-transmitted. It is therefore possible to prevent any situation that no electronic signature can be added at the set timer transmission date/time because the necessary private key and electronic certificate are deleted.

Second Embodiment

Figure 15A:
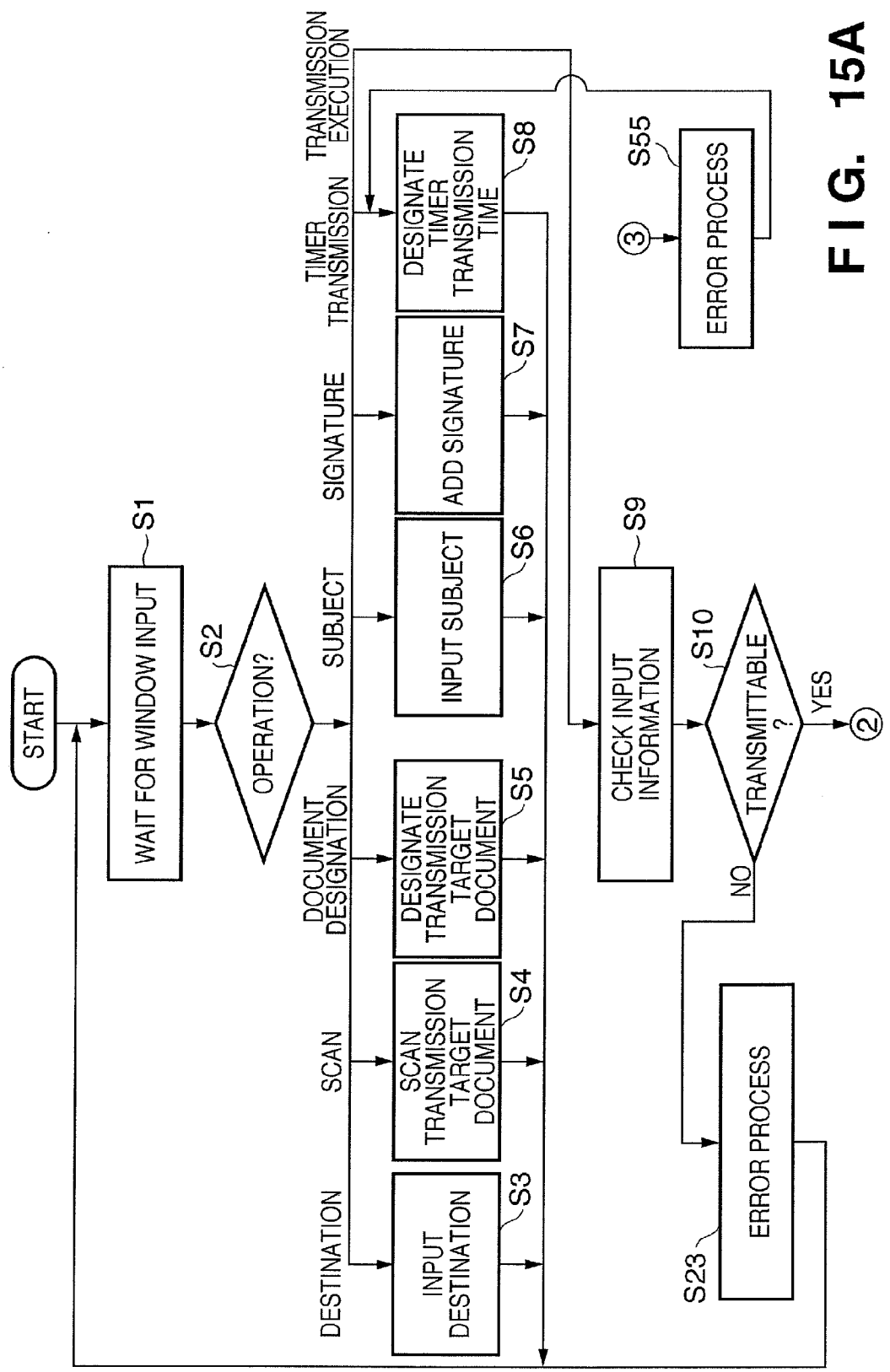
FIGS. 15A-B are flowcharts for explaining the manipulation and operation of the electronic-signature-attached electric document transmission function of an MFP according to the second embodiment of the present invention.
Figure 15B:
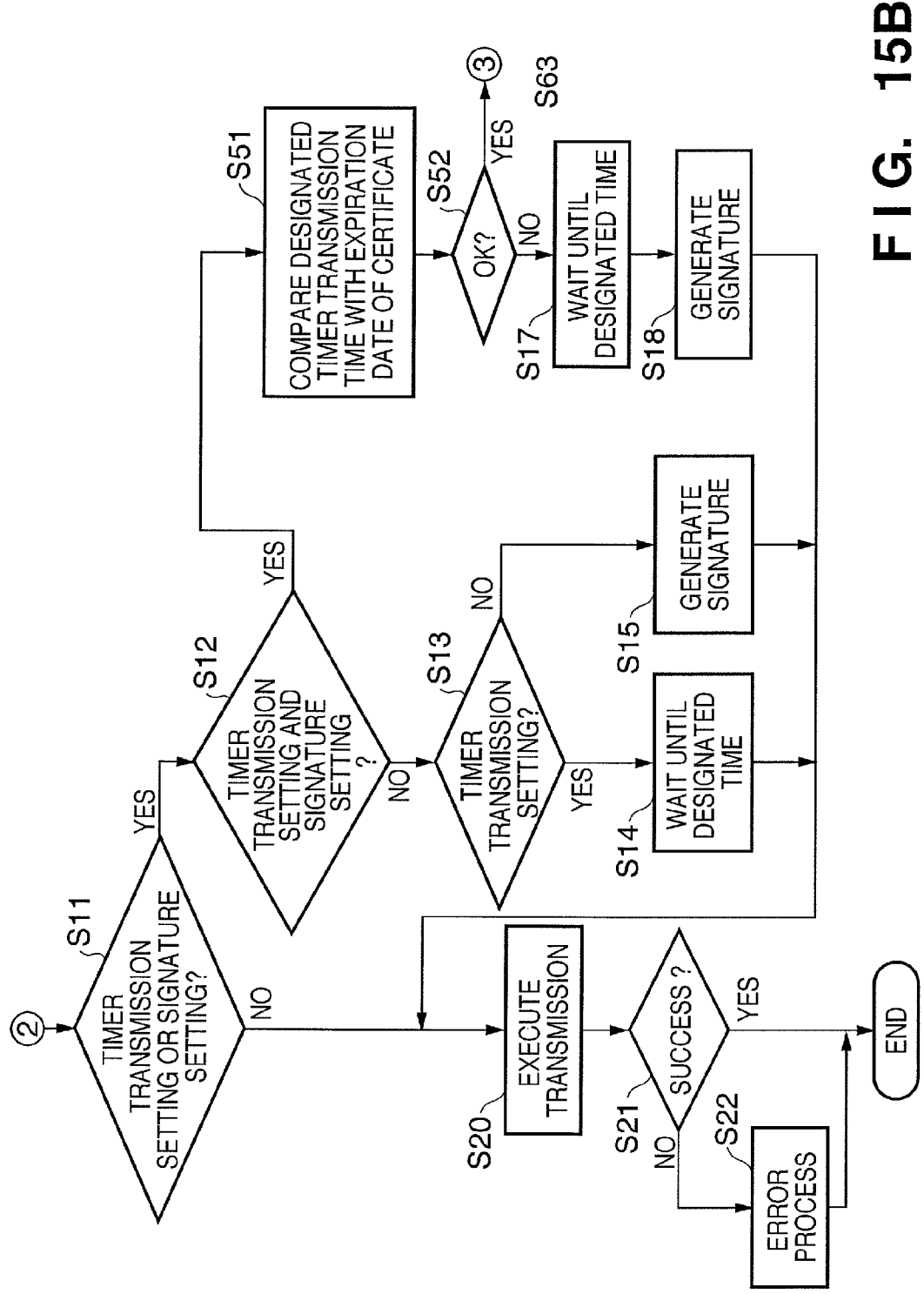

FIGS. 15A-B are flowcharts for explaining the manipulation and operation of the electronic-signature-attached electric document transmission function of an MFP 110 according to the second embodiment of the present invention. The same step numbers as in the above-described flowcharts of FIGS. 5A-B denote the same processes in FIGS. 15A-B, and a description thereof will be omitted. A program to execute this process is stored in a ROM 202 or hard disk 209 and executed under the control of a CPU 201. The MFP 110, server apparatus 120, and client apparatus 130 according to the second embodiment have the same hardware configurations as in the above-described first embodiment, and a description thereof will be omitted.

In step S12, it is determined whether both electronic signature addition and timer transmission are set. If only one of them is set, the process advances to step S13. If both are set, the process advances to step S51. In step S51, an electronic certificate to be used for generating an electronic signature is selected from electronic certificates stored in an NVRAM 204 or hard disk 209, and the expiration date of the selected electronic certificate is acquired. A set timer transmission date/time is compared with the acquired expiration date of the electronic certificate. If it is determined in step S52 that the timer transmission date/time falls within the valid time of the electronic certificate, the process advances to step S17 to execute normal timer transmission. On the other hand, if it is determined in step S52 that the timer transmission date/time falls outside the valid time of the electronic certificate, the process advances to step S55 to execute an error process.

In the error process, a touch panel 401 displays a message "The date/time that you have designated for timer transmission is outside the valid time of the electronic certificate to be used for the electronic signature. Please select another key and certificate or set another date/time for timer transmission", thereby invalidating the setting.

In step S17, the process is temporarily stopped until the designated timer transmission date/time. At the designated date/time, the electronic document designated as a transmission target document is read out from the hard disk, converted into the file format designated in step S5, and held in a RAM 203. The process advances to step S18 to generate an electronic signature for the electronic document to be transmitted. After the electronic signature is added to the electronic document, the process advances to step S20 to transmit e-mail.

As described above, according to the second embodiment, when the timer transmission date/time falls outside the valid time of an electronic certificate to be used for an electronic signature, a warning (warning display) can be presented to the user. It is therefore possible to prevent any situation that the electronic signature of an electronic certificate is invalid because the electronic certificate has already expired at the timer transmission date/time.

Third Embodiment

Figure 16A:
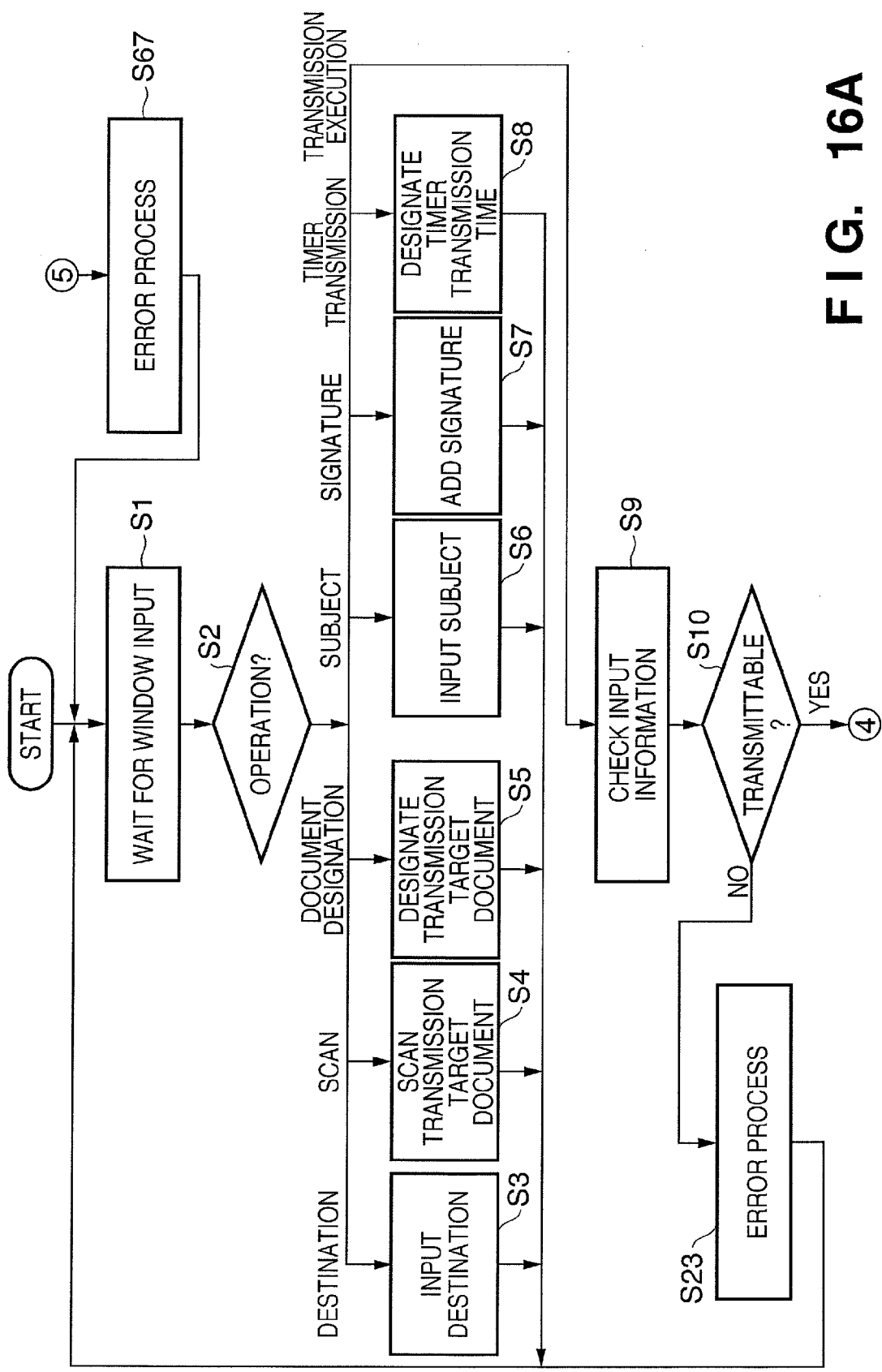
FIGS. 16A-B are flowcharts for explaining the manipulation and operation of the electronic-signature-attached electric document transmission function of an MFP according to the third embodiment of the present invention.
Figure 16B:
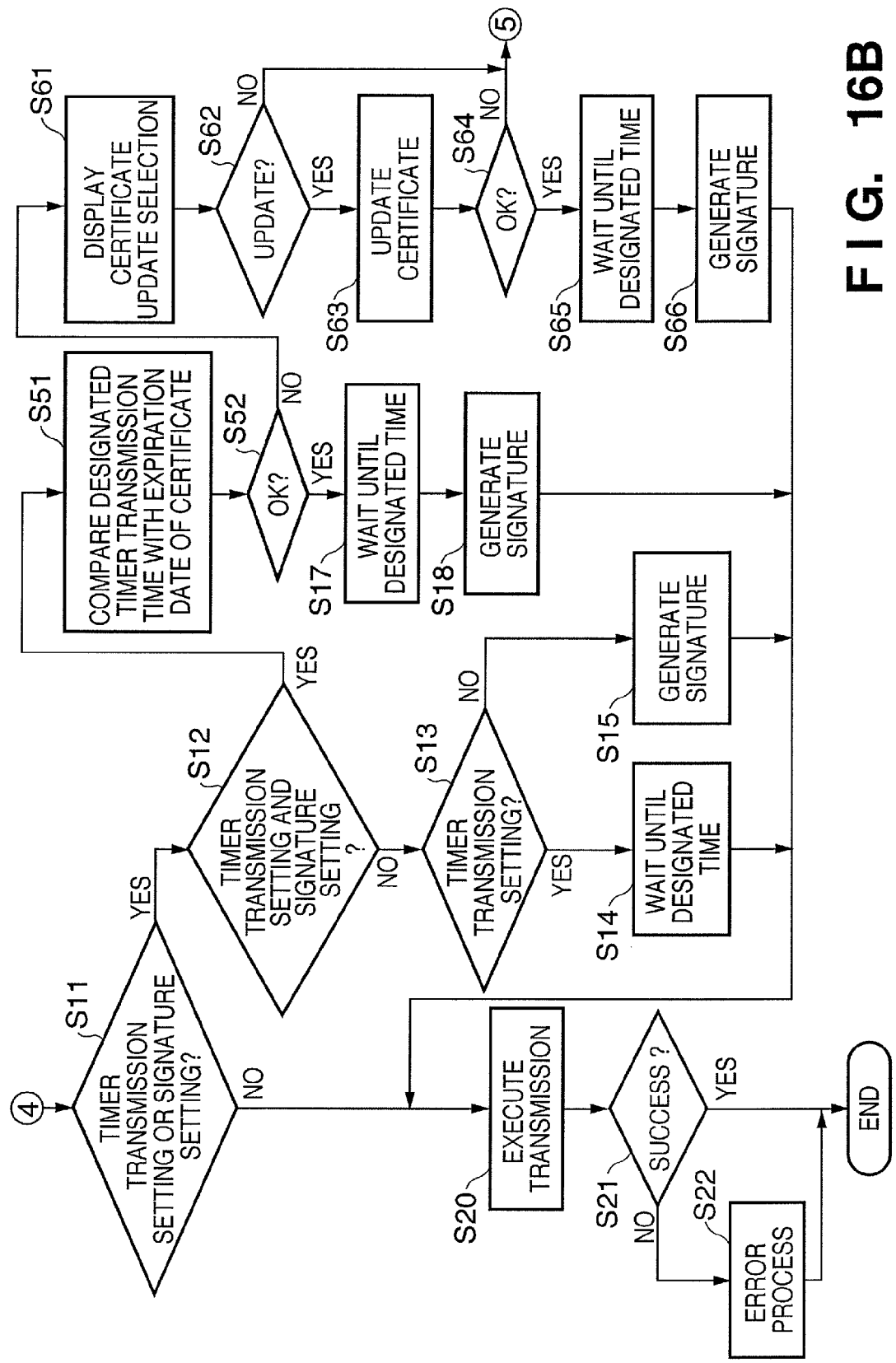

FIGS. 16A-B are flowcharts for explaining the manipulation and operation of the electronic-signature-attached electric document transmission function of an MFP 110 according to the third embodiment of the present invention. The same step numbers as in the above-described flowchart of FIGS. 15A-B denote the same processes in FIGS. 16A-B, and a description thereof will be omitted. A program to execute this process is stored in a ROM 202 or hard disk 209 and executed under the control of a CPU 201. The MFP 110, server apparatus 120, and client apparatus 130 according to the third embodiment have the same hardware configurations as in the above-described first embodiment, and a description thereof will be omitted. Processes different from the flowcharts in FIGS. 5 and 15 will mainly be described here.

In step S12, it is determined whether both electronic signature addition and timer transmission are set. If only one of them is set, the process advances to step S13. If both are set, the process advances to step S51. In step S51, an electronic certificate to be used for generating the electronic signature is selected from electronic certificates stored in an NVRAM 204 or hard disk 209, and the expiration date of the selected electronic certificate is acquired. In step S52, a set timer transmission date/time is compared with the expiration date of the electronic certificate. If it is determined that the timer transmission date/time falls within the valid time of the electronic certificate, the process advances to step S17 to execute timer transmission with electronic signature addition.

Figure 17:
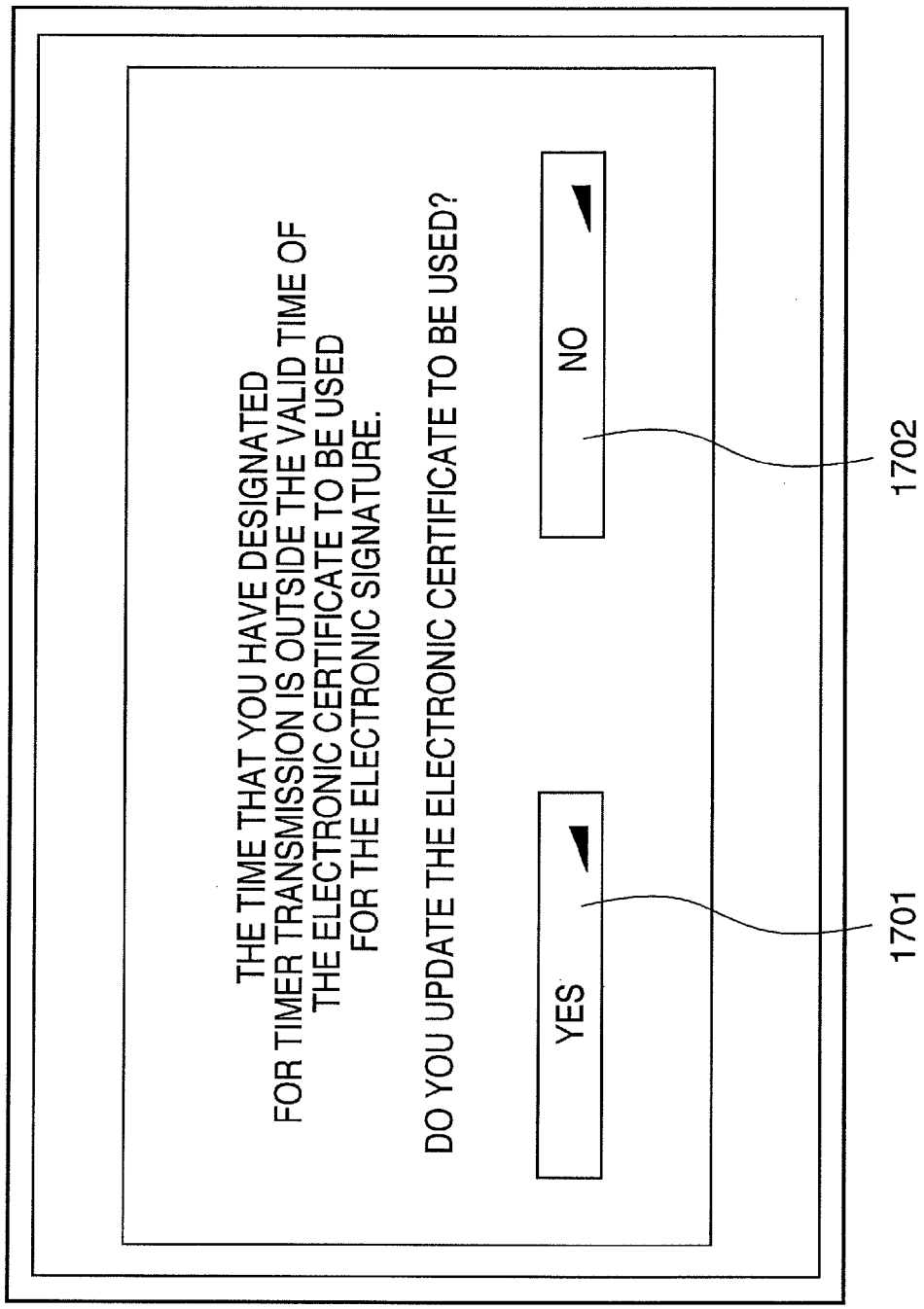
FIG. 17 is a view showing an example of a window for setting whether to update an electronic certificate in the MFP according to the third embodiment of the present invention.

On the other hand, if the timer transmission date/time falls outside the valid time of the electronic certificate in step S52, the process advances to step S61 to display, on a touch panel 401, a window for selecting whether to update the electronic certificate to be used for generating the electronic signature, as shown in FIG. 17.

FIG. 17 is a view showing an example of a window for setting whether to update an electronic certificate in the MFP according to the third embodiment of the present invention.

To update the electronic certificate, the user presses a "YES" button 1701. Otherwise, the user presses a "NO" button 1702.

In step S62, the pressed button is determined. If the "YES" button 1701 is pressed, the process advances to step S63. If the "NO" button 1702 is pressed, the process advances to an error process in step S67. In the error process of step S67, the touch panel 401 displays a message "Update of the certificate is canceled. For transmission, please select another key and electronic certificate or set another date/time for timer transmission". When the user presses an OK button in this window, the process returns to step S1.

To update the electronic certificate, the electronic certificate to be used for an electronic signature is updated in step S63, and the process advances to step S64. In step S64, it is determined whether update of the electronic certificate has succeeded. If the electronic certificate is updated, the process advances to step S65. If update of the electronic certificate has failed, the process advances to the error process in step S67. In this case, the touch panel 401 displays, in step S67, a message "Update of the electronic certificate has failed. For transmission, please select another key and electronic certificate or set another date/time for timer transmission". When the user presses an OK button in this window, the process returns to step S1.

In step S65, the process is temporarily stopped until the designated timer transmission date/time. At the designated date/time, the electronic document designated as a transmission target document is read out from the hard disk, converted into the file format designated in step S5, and held in a RAM 203. The process advances to step S66 to generate, by using the updated electronic certificate, an electronic signature for the electronic document to be transmitted. After the electronic signature is added to the electronic document, the process advances to step S20 to transmit e-mail.

Figure 18:
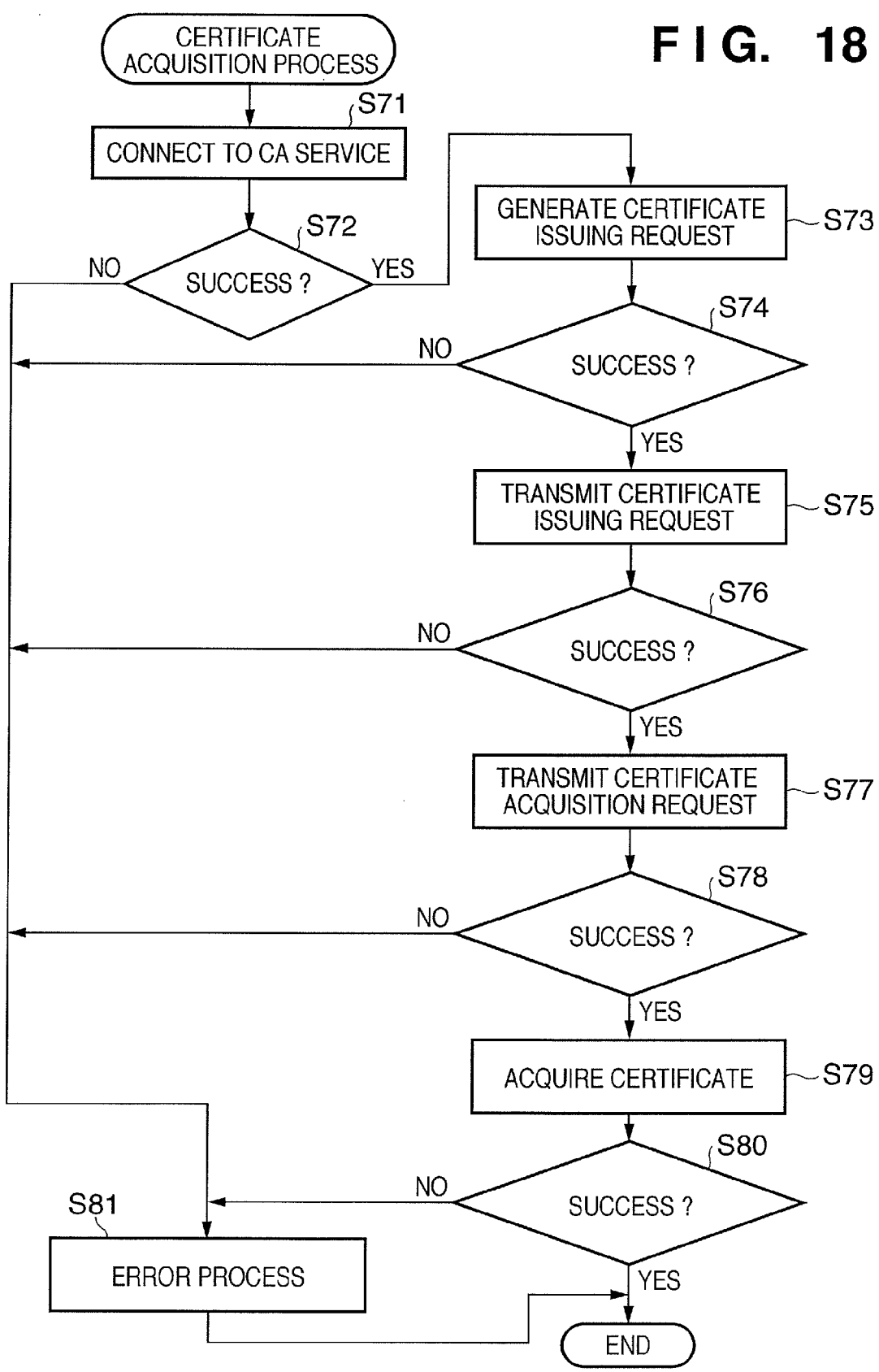
FIG. 18 is a flowchart illustrating an example of an electronic certificate update process in step S64 according to the third embodiment.
Figure 19:
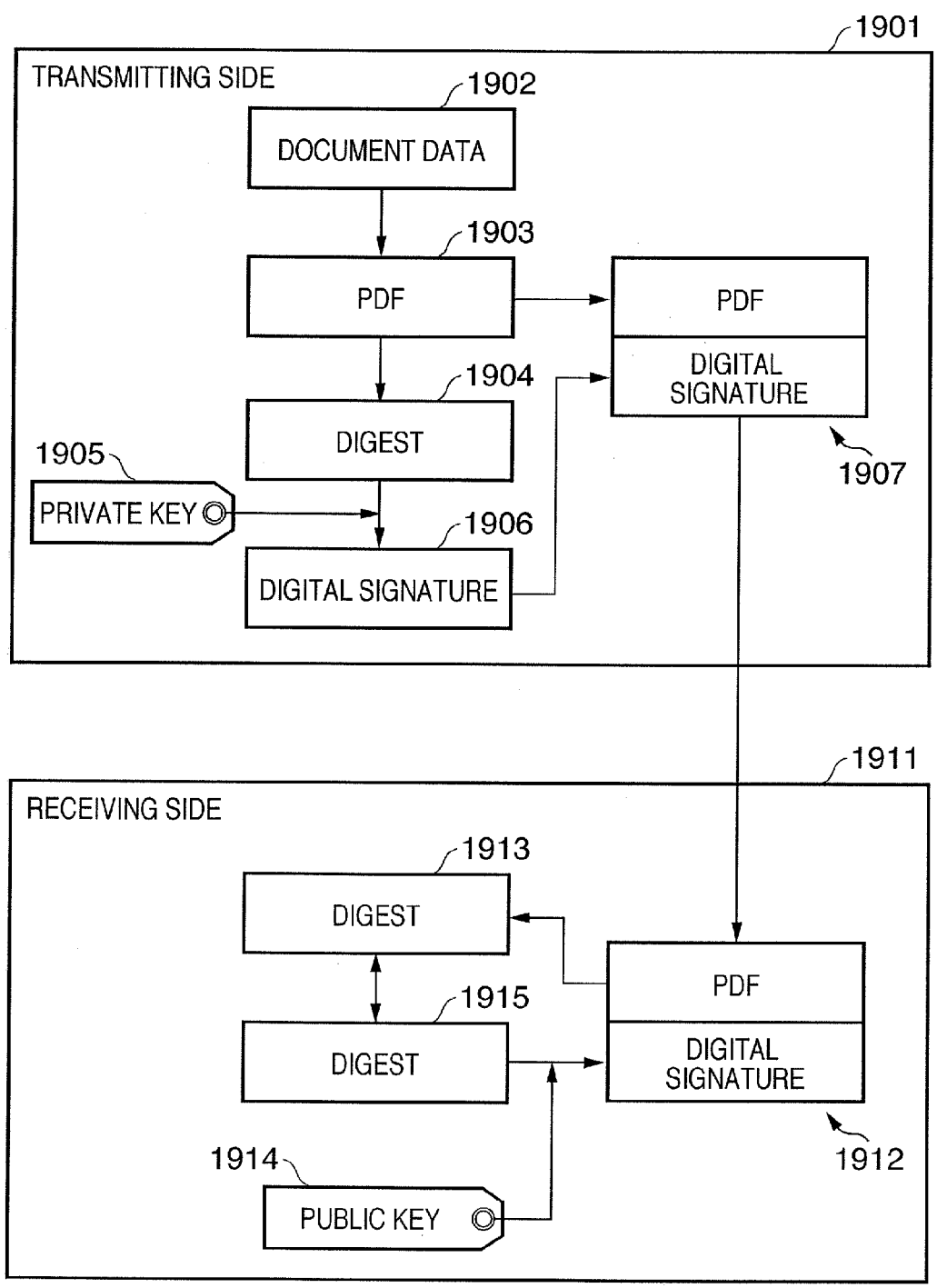
FIG. 19 is a view simply illustrating the mechanism of a conventional digital signature.

FIG. 18 is a flowchart illustrating an example of an electronic certificate update process in step S64 according to the third embodiment.

In the third embodiment, the server apparatus 120 on a network 100 executes a CA service to receive an electronic certificate issuing request, issue an electronic certificate based on the issuing request, and update the electronic certificate. The MFP 110 requests the CA service to update an electronic certificate and acquires the updated electronic certificate online.

In step S71, the MFP 110 is connected to the CA service. If it is determined in step S72 that connection has succeeded, the process advances to step S73. In step S73, the MFP 110 generates a CSR that is format data to request an electronic certificate to be updated. If it is determined that CSR generation has succeeded, the process advances to step S75 to transmit, to the CA service in the server apparatus 120, a request (to be referred to as an issuing request hereinafter) to update and issue an electronic certificate together with the CSR generated in step S73. If it is determined in step S76 that issuing request transmission has succeeded, the process advances to step S77. In step S77, the MFP 110 transmits, to the server apparatus 120, an electronic certificate acquisition request corresponding to an issuing request. If it is determined that acquisition request transmission has succeeded, the process advances from step S78 to step S79. In step S79, the MFP 110 acquires the updated/issued electronic certificate. The process advances to step S80. If it is determined that acquisition of the updated/issued electronic certificate has succeeded, the process is ended.

On the other hand, if it is determined in one of steps S72, S74, S76, S78, and S80 that the process has failed, the process advances to an error process in step S81 to disconnect the CA service, and the process is ended.

In this embodiment, it is assumed that a certificate management protocol such as CMP, which uses a communication protocol such as HTTP or FTP for transport, is used as the control/communication protocol related to electronic certificate management between the MFP 110 and the server apparatus 120. However, the present invention is not limited to this. Communication may be done using any other existing or unique electronic certificate management control/communication protocol.

As described above, this embodiment enables reliable timer transmission of data with an electronic signature by preventing deletion of a pair of private key and public key and an electronic certificate containing the public key, which are held in the MFP 110 and to be used for generating the electronic signature.

It is also possible to timer-transmit data with an electronic signature while preventing invalid electronic signature addition by suppressing timer transmission setting with invalid signature addition to data, setting a new valid timer transmission date/time, and updating an invalid electronic certificate.

Other Embodiments

The embodiments of the present invention have been described above in detail. The present invention is applicable to a system including a plurality of devices or an apparatus including a single device.

The present invention is also achieved by supplying a software program to implement the functions of the above-described embodiments to the system or apparatus directly or from a remote site and causing the computer of the system or apparatus to read out and execute the supplied program. In this case, the present invention need not always take the form of a program as long as the functions of the program are available.

Hence, the program codes themselves which are installed in a computer to implement the functional processing of the present invention also implement the present invention. That is, the claims of the present invention also incorporate the computer program to implement the functional processing of the present invention. In this case, the program can take any form such as an object code, a program to be executed by an interpreter, or script data to be supplied to the OS as long as the functions of the program are available.

Examples of a recording medium to supply the program are a Floppy® disk, hard disk, optical disk, magnetooptical disk, MO, CD-ROM, CD-R, CD-RW, magnetic tape, nonvolatile memory cards ROM, and DVD (DVD-ROM and DVD-R).

The following program supply method is also available. A client computer may connect to a homepage on the Internet via a browser to download the program from the homepage to a recording medium such as a hard disk. In this case, either the computer program itself of the present invention or a compressed file containing an automatic installation function can be downloaded. The program codes contained in the program of the present invention may be divided into a plurality of files so that the user can download the files from different homepages. That is, a WWW server which causes a plurality of users to download the program file to implement the functional processing of the present invention is also incorporated in the claims of the present invention.

The program of the present invention may be encrypted, stored in a storage medium such as a CD-ROM, and distributed to users. Any user who satisfies predetermined conditions can download key information to decrypt the program from a homepage through the Internet. The user can execute the encrypted program by using the key information and install the program in the computer.

The functions of the above-described embodiments are implemented when the computer executes the readout program. The functions of the above-described embodiments are also implemented when, for example, the OS running on the computer partially or wholly executes actual processing based on the instructions of the program.

The functions of the above-described embodiments are also implemented when the program read out from the recording medium is written in the memory of a function expansion board inserted into the computer or a function expansion unit connected to the computer and executed. That is, the CPU of the function expansion board or function expansion unit can partially or wholly execute actual processing.

According to the present invention, when data with an electronic signature is to be transmitted at a designated time, the data having an adequate electronic signature can be transmitted at the designated time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-313597, filed Nov. 20, 2006, and Japanese Patent Application No. 2007-146105, filed May 31, 2007, which are hereby incorporated by reference herein in their entirety.

What is claimed is:

1. A communication apparatus having a function of transmitting data at a designated time, comprising:
a storage unit configured to store generation information to be used for generating an electronic signature;
a signature generation unit configured to generate the electronic signature using the generation information;
a transmission reserving unit configured to reserve transmission of data to which the electronic signature generated by the signature generation unit is to be added;
a receiving unit configured to receive from a user a request for deleting the generation information; and
a delete unit configured to delete, in a case where the receiving unit receives the request for deleting the generation information and the transmission of the data to which the electronic signature is to be added is not reserved by the transmission reserving unit, the generation information,
wherein the delete unit, in a case where the receiving unit receives the request for deleting the generation information and the transmission of the data to which the electronic signature is to be added is reserved by the transmission reserving unit, does not delete the generation information to be used for generating the electronic signature.

2. The apparatus according to claim 1, wherein the transmission reserving unit is configured to reserve the transmission so that the data to which the electronic signature generated by the signature generation unit is to be added is transmitted at a designated time.

3. A control method of a communication apparatus having a function of transmitting data at a designated time, comprising:

reserving transmission of data to which generated electronic signature is to be added, the generated electronic signature being generated by using generation information, the generation information being stored in a memory and to be used for generating the electronic signature
receiving a request for deleting the generation information from a user; and
deleting, in a case where the request for deleting the generation information is received and the transmission of the data to which the electronic signature is to be added is not reserved, the generation information,
wherein, in a case where the request for deleting the generation information is received and the transmission of the data to which the electronic signature is to be added is reserved,
the generation information to be used for generating the electronic signature is not deleted.

4. The method according to claim 3, wherein the data for which transmission is reserved and having the generated electronic signature is transmitted at a designated time.

5. A non-transitory computer readable medium storing a program for controlling a communication apparatus having a function of transmitting data at a designated time, the program comprising:
a code to generate an electronic signature by using generation information being stored in a memory and to be used for generating an electronic signature;
a code to delete the generation information;
a code to reserve transmission of data to which the generated electronic signature is to be added;
a code to receive a request from a user for deleting the generation information; and
a code to delete, in a case where the request for deleting the generation information is received and the transmission of the data to which the electronic signature is to be added is not reserved, the generation information,
wherein, in a case where the request for deleting the generation information is received and the transmission of the data to which the electronic signature is to be added is reserved, the generation information to be used for generating the electronic signature is not deleted.

6. The non-transitory computer readable medium according to claim 5, wherein the data to which the generated electronic signature is to be added is transmitted at a designated time.

7. The apparatus according to claim 1, wherein
said delete unit, in a case where the receiving unit receives the request for deleting the generation information and the transmission of the data to which the electronic signature is to be added is reserved by the transmission reserving unit, notifies a user of an error message without deleting the generation information to be used for generating the electronic signature.

8. The apparatus according to claim 2, further comprising a designating unit configured to designate the time of the transmission of the data in accordance with an instruction from a user.

* * * * *